United States Patent [19]
Larson

[11] Patent Number: 5,455,930
[45] Date of Patent: Oct. 3, 1995

[54] STATE MACHINE WITH ADAPTABLE TIMING AND STATE GENERATION MECHANISMS

[75] Inventor: Ronald J. Larson, Minneapolis, Minn.

[73] Assignee: Micral, Inc., New Brighton, Minn.

[21] Appl. No.: 942,753

[22] Filed: Sep. 9, 1992

Related U.S. Application Data

[63] Continuation-in-part of Ser. No. 840,883, Feb. 25, 1992, Pat. No. 5,412,795.

[51] Int. Cl.$^6$ .............................. G06F 13/42; G06F 13/38; G06F 13/00
[52] U.S. Cl. ..................................... 395/550; 364/DIG. 2; 364/977.5; 364/950; 364/950.2; 364/934; 364/934.2; 364/934.3; 395/500
[58] Field of Search .............................. 377/39, 114, 52, 377/118; 395/550, 325, 500

[56] References Cited

U.S. PATENT DOCUMENTS

| | | | |
|---|---|---|---|
| 4,321,687 | 3/1982 | Parsons et al. | 364/DIG. 2 |
| 4,608,706 | 8/1986 | Chang et al. | 377/39 |
| 4,675,865 | 6/1987 | De Vries et al. | 370/85 |
| 4,852,157 | 7/1989 | Tyrrell | 379/236 |
| 5,341,495 | 8/1994 | Joyce et al. | 395/500 |

*Primary Examiner*—Eddie P. Chan
*Attorney, Agent, or Firm*—Westman, Champlin & Kelly

[57] ABSTRACT

A state machine in a computer system receives operation parameters, a clock signal and control signals from a control device. The state machine provides output signals in logical output states to perform an operation based on the operation parameters, the clock signal and the control signals. The operation parameters provided by the control device include timing parameters and state parameters which are stored. A counter provides a counter output based on the clock signal and based on the stored timing parameters. A counter control circuit compares the counter output with timing parameters and controls operation of the counter based on the control signals provided by the control device and based on the comparison of the counter output with the timing parameters. A state generator compares the counter output with the state parameters and generates the output signals in logical output states, each logical output state having a duration based on the comparison of the counter output with the state parameters.

28 Claims, 14 Drawing Sheets

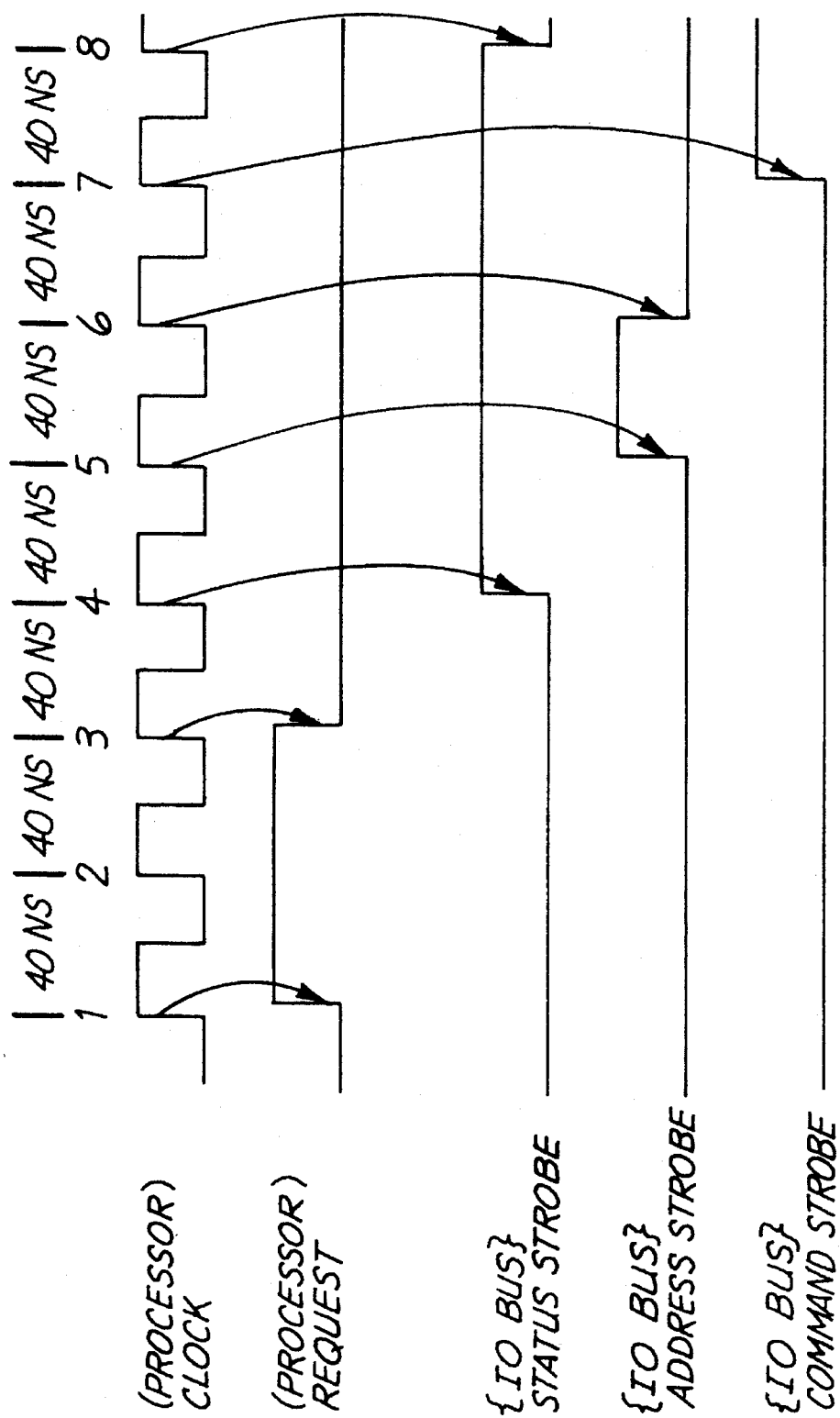

|  | UPPER LIMIT | LOWER LIMIT |
|---|---|---|
| CONTROL SIGNAL A | 5 | 1 |
| CONTROL SIGNAL B | 4 | 3 |
| CONTROL SIGNAL C | 3 | 2 |

Fig. 4A

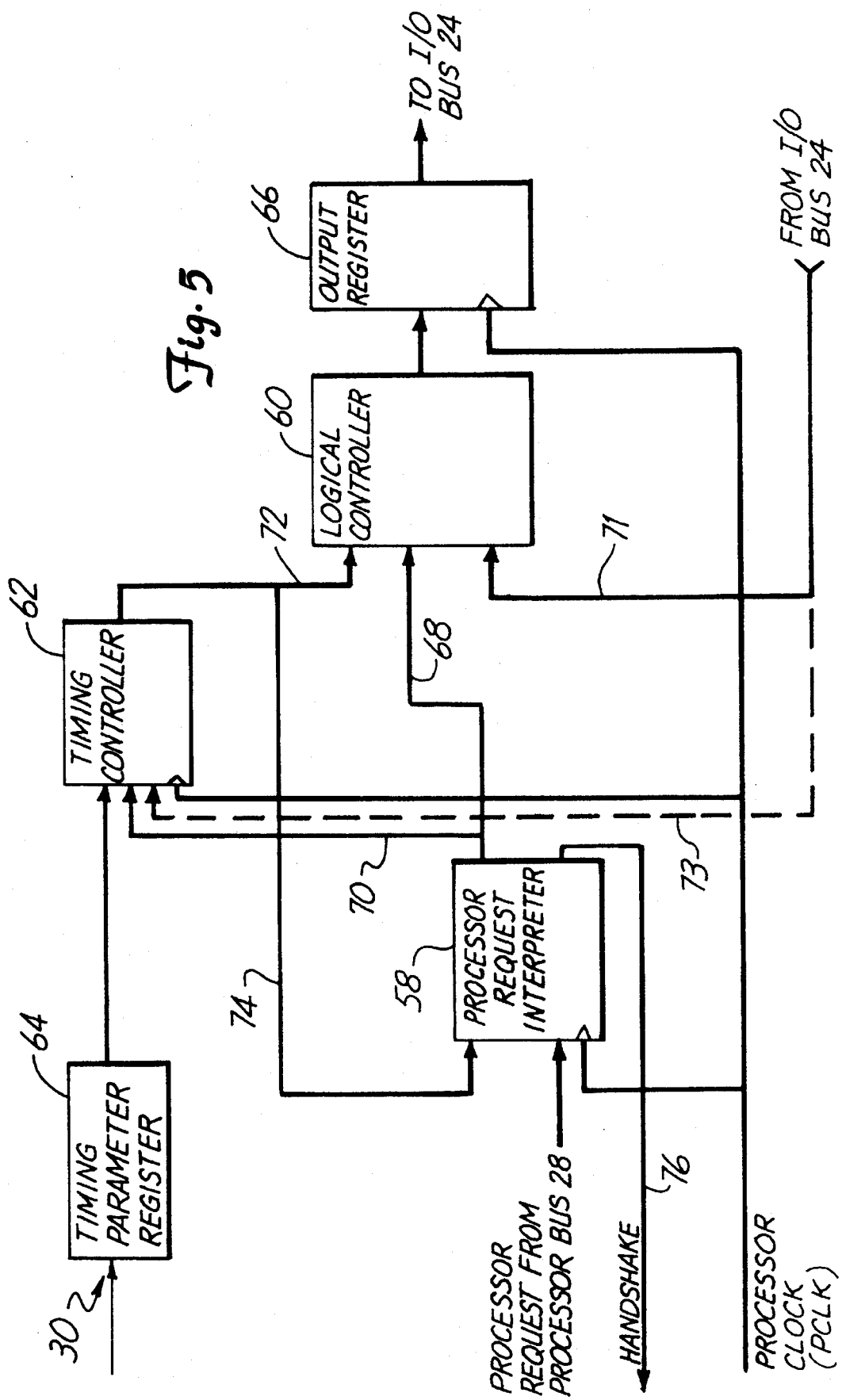

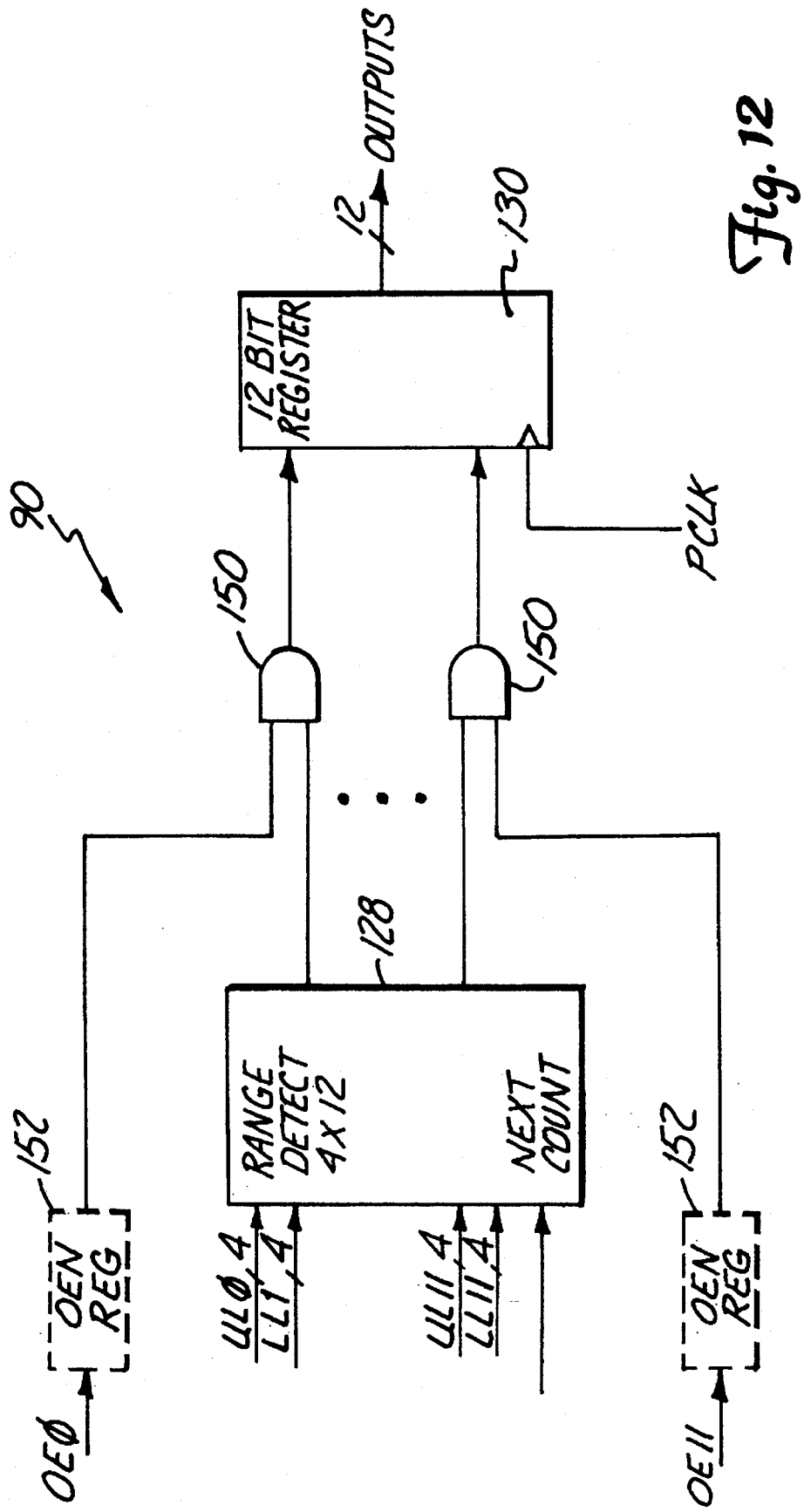

STATE MACHINE WITH ADAPTABLE TIMING AND STATE GENERATION MECHANISMS

This invention is a continuation-in-part of Application Ser. No. 07/840,883, filed Feb. 25, 1992, now U.S. Pat. No. 5,412,795.

BACKGROUND OF THE INVENTION

The present invention deals with a state machine. More particularly, the present invention deals with a state machine which has adaptable and programmable timing and state generation mechanisms.

State machines are used in a wide variety of applications. Prior state machines typically included two major components. The first component included combinational logic and the second component included an output register. The combinational logic accepted inputs from an input source and provided an output to the output register based on the inputs. The output register was clocked to store the outputs from the combinational logic. The outputs were then fed back into the combinational logic and a new logical output was generated by the combinational logic. This new logical output was then clocked into the output register with the next clock pulse.

With prior state machines, the logical outputs were designed into the combinational logic and were therefore set. In other words, the combinational logic was not programmable to provide different logical output states with the same input signals. Further, the duration of each logical output state was tied directly to the frequency of the clock which clocked the output register. If the clock clocked the output register at an increased speed, yet slowly enough so that the combinational logic could process the new inputs, the duration of each logical output state would decrease as the clock frequency increased. Therefore, if the user of the prior state machine desired that either the logical output states change with certain inputs, or that the duration of each logical output state change, without changing the clock frequency, the combinational logic in the state machine needed to be redesigned. This was very costly and time consuming.

One example of a system in which state machines are generally used, and where adaptability is desirable, is in a computer system. A computer system typically has a number of components or devices. The components are coupled to one another through busses. A bus, along with the particular component or components supported by the bus, are collectively referred to as a bus environment. Various bus environments in a computer system serve as connection points for the components in the system so that the components can communicate with one another, or so that one component can access or manipulate another component.

However, it is common that different components have different communication systems or protocols. Thus, the different components need different bus environments to support them in communication with other components.

As an example, a typical computer system has a processor device (or several processor devices) and input/output (I/O) devices. The processor runs on a processor clock. Therefore, the processor bus environment runs on a time system based on the processor clock. A typical processor bus is defined or specified by the manufacturer or designer of the processor device. For example, the output signals from a processor device step through a certain cycle when performing a read operation on I/O devices. The logical state of the output signals, as well as the timing of those logical states are specified by the manufacturer or designer of the processor device. The processor is typically connected to a processor bus and the I/O devices are typically connected to an I/O bus.

However, the I/O devices are not synchronous with the processor clock and the I/O bus therefore runs on a different time system, other than the processor clock. Further, the logical output states provided by the controller to perform a certain operation may be incompatible, both logically and temporally, with the I/O bus specification. Thus, there is a need to facilitate communication between the processor bus environment and the I/O bus environment so that the processor device can manipulate or communicate with the I/O devices. A circuit which facilitates communication between the two bus environments is typically referred to as a bus interface circuit and utilizes a state machine.

In addition, another aspect of computer systems magnifies the communication problem addressed by a bus interface circuit. Processor specifications have historically been a moving target. In other words, processor designers improve both the functional and speed performance features of the processor with each new generation of processor device. Therefore, with each new generation of processor device, it is typical for a processor bus to have new specifications making the new processor incompatible with previous bus interface circuitry.

Specifically, new processors may contain two types of changes over previous processors. The first is a functional change. If the processor is functionally different than the previous processor, the functional definition of the output signals, or control signals, which are provided from the processor during any given cycle (e.g. a read cycle) are different than they were in the previous generation processor. The output signals simply have different logical output states which define a read cycle. It is evident that such a change requires redesign of the bus interface circuitry responsible for providing the communication link between the processor bus environment and I/O bus environment.

The second type of change which may be made to the processor is a change in the timing or the speed at which the processor operates. It is very common for a new generation of processor to operate at higher speeds than the preceding processor. The problem with such a speed or timing change, in the context of the example in which a processor is coupled to I/O devices such as memory devices, is that the bus interface circuitry is typically designed to optimize the performance of the processor in accessing the I/O devices at the particular speed at which the processor runs. To accomplish this, the bus interface circuitry is typically synchronized with the processor clock. Therefore, when the speed of the processor clock increases or changes, the interface circuitry (if it is even capable of accommodating the faster or slower operation) tracks the processor clock resulting in a corresponding speed or timing change in the output from the bus interface circuitry. Such a change in speed causes the bus interface circuitry to be incompatible with the I/O bus characteristics.

While new generation processors typically change in both speed and function, there are usually no corresponding changes to the I/O bus environment. Unlike the processor bus environment, the I/O bus environment has timing and functional characteristics that do not change (or change quite minimally) over a long period of time. Such a stable I/O bus specification is valuable to the end user of the system because as long as the new generation processors have bus interface circuits which make the new generation processors compatible with the stable I/O bus specification, the end user can upgrade a processor system without incurring the cost of changing all I/O devices. Instead, the end user can use the same I/O devices on a wide variety of processor systems. Such a feature saves expense because the end user can buy I/O devices in greater quantity, the I/O devices can be used in a wide variety of systems, and the I/O devices will not become incompatible with new processor bus environments.

Given the fact that the I/O bus is typically a static design target in that it does not change over many years, and given the fact that the processor bus does change with each new generation of processor, the bus interface circuitry has to change because it is typically synchronously coupled to the processor bus environment. Any significant functional or timing change in the processor therefore renders previous bus interface circuitry, which used prior state machines, unusable with later generation processors. This is true even though the I/O bus specification remains the same.

The reason the bus interface circuitry is relatively inflexible is due to the traditional design of the bus interface circuitry. It is typically designed as a synchronous state machine which specifically relates to the speed of the processor clock and which has a set logic function. Thus, when the speed of the synchronous processor clock changes, the logical and timing operation of the bus interface circuitry changes.

One method used in the past in an attempt to solve the problem of providing communication between the relatively fixed specification for the I/O bus environment and an ever changing processor bus environment was adaptation of functional state machine equations to accommodate several speeds of processor clock and which has a set logical function. However, this task proved to be very complicated. Further, the logical outputs were still specific to the particular clock speeds chosen by the designer. The root of the problem was that in an efficient state machine, no distinction was made between the logical functions which are accomplished and the timing associated with those functions.

In short, simply running the processor clock faster resulted in the outputs provided to the I/O bus from the interface circuitry also being faster. However, the I/O bus control signals are specified with specific timing parameters which are not, in any way, related to the processor clock. By increasing the speed at which the output signals from the bus interface circuitry are provided at the I/O bus, the output signals from the bus interface circuitry move outside the specification of timing parameters for the I/O bus and therefore the interface circuitry becomes incompatible with the I/O bus and needs to be redesigned.

Therefore, there is a need for bus interface circuitry which remains compatible with the I/O bus specifications regardless of the speed at which the processor is operating and regardless of changes in the logical output signals which constitute a processor request. Such a mechanism would save both time and money previously spent in redesigning bus interface circuitry to properly interface the I/O bus environment with the rapidly changing processor bus environment.

Such interface circuitry is but one specific example where a fully adaptable state machine would be useful. A state machine having adaptable logical functions, as well as adaptable timing functions would solve many problems in many different applications.

SUMMARY OF THE INVENTION

A state machine in a computer system receives operation parameters, a clock signal and control signals from a controller. The state machine provides output signals in logical output states to perform an operation based on the operation parameters, the clock signal and the control signals. The operation parameters provided by the controller include timing parameters and state parameters which are stored. A counter provides a counter output based on the clock signal and based on the stored timing parameters. A counter control circuit compares the counter output with the timing parameters and controls operation of the counter based on the control signals provided by the controller and based on the comparison of the counter output with the timing parameters. A state generator compares the counter output with the state parameters and generates the output signals in logical output states, each logical output state having a duration based on the comparison of the counter output with the state parameters.

BRIEF DESCRIPTION OF THE DRAWINGS

FIG. 2A is a timing diagram associated with a typical bus interface circuit.

FIG. 4A is a table showing upper and lower limits for a plurality of control signals.

FIG. 5 is a block diagram of a bus interface circuit of the present invention.

FIG. 01 is a timing diagram corresponding to the state machine shown in FIG. 9.

FIG. 12 is a second embodiment of a state generator of the present invention.

DETAILED DESCRIPTION OF THE PREFERRED EMBODIMENTS

1. Overview

The present invention can be used in many applications. However, because state machines are widely used in interface circuitry to interface various bus environments, the present invention will be described primarily in the context of bus interface circuitry.

Figure 1:
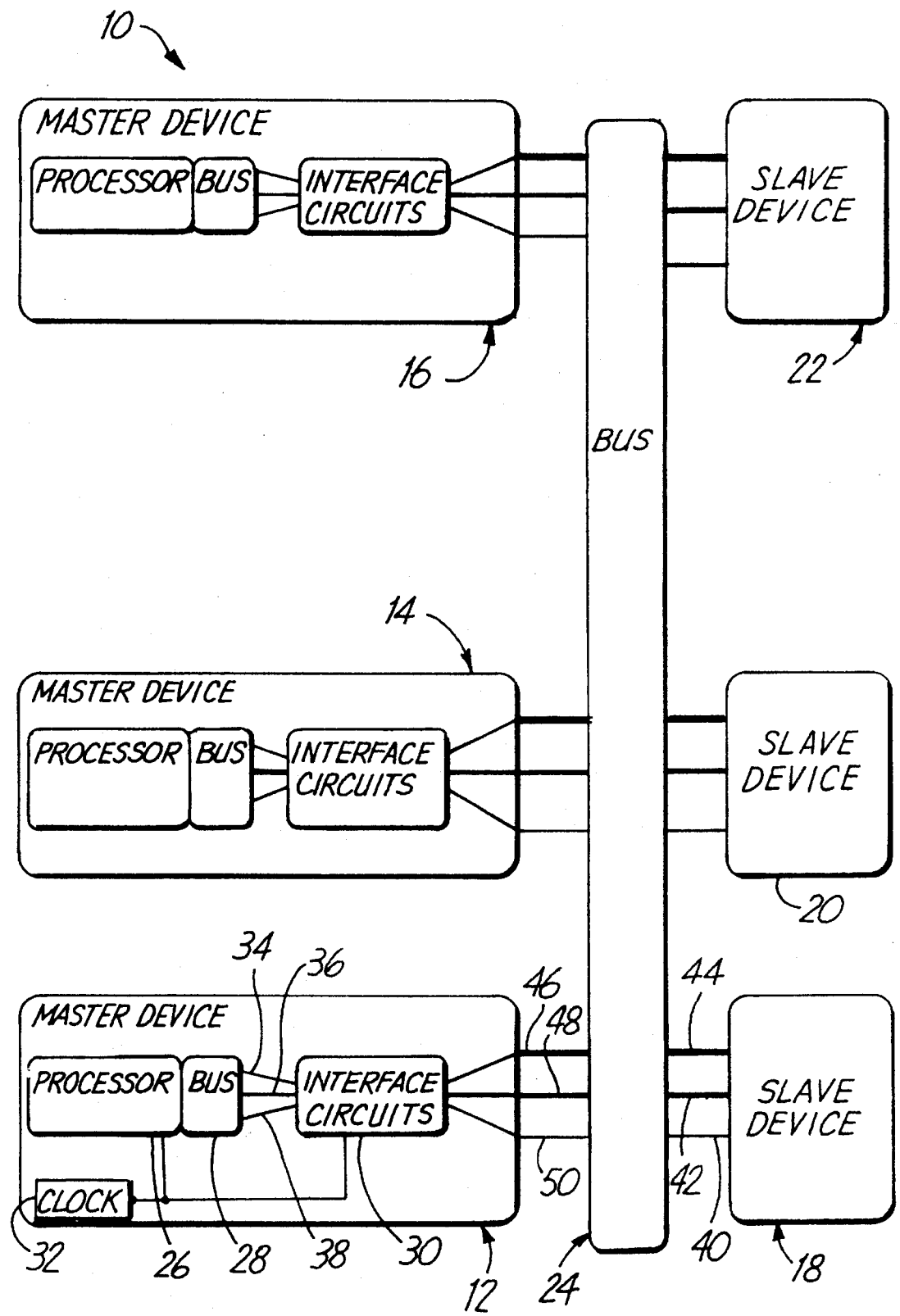
FIG. 1 is block diagram of a computer system.

FIG. 1 shows a typical computer system 10 which includes a number of master devices 12, 14, and 16, associated with a number of slave devices 18, 20, and 22. Master devices 12, 14, and 16, as well as slave devices 18, 20, and 22, are coupled to bus 24. Bus 24 provides means by which the master devices communicate with one another, and with the slave devices.

In the embodiment shown in FIG. 1, each of the master devices 12, 14, and 16 include a processor 26, processor bus 28, interface circuit 30, and clock 32. Processor 26 is typically any type of microprocessor used in a computer system. Processor bus 28 is a bus which is specified for operation with processor 26 and which is used by processor 26 to communicate with other devices or components in computer system 10. Processor 26 and bus 28 are synchronous with one another and are driven by processor clock 32. Processor 26 provides, through processor bus 28, signals such as control signals, address signals, and data signals along signal paths indicated by lines 34, 36, and 38.

In this preferred embodiment, slave devices 18, 20, and 22 contain memory devices which provide storage capacity for the processors in master devices 12, 14, and 16. It should be noted that slave devices 18, 20 and 22 can be any type of slave devices. However, memory devices are commonly used in computer systems such as system 10. Therefore, memory devices, being preferred slave devices, are chosen for illustrative purposes. Thus, the memory devices which comprise slave devices 18, 20, and 22 are accessed and manipulated by master devices 12, 14, and 16. Processor 26 provides signals, through bus 28, to bus interface circuit 30 along signal paths 34, 36, and 38. Bus interface circuit 30, in turn, provides signals to bus 24 along signal paths 46, 48, and 50. Bus 24 provides the signals (which may comprise address, data and control signals) to the memory devices of slave device 18 along signal paths represented by lines 40, 42, and 44. Also, slave device 18 provides return signals (such as data and timing signals) to processor 26 via bus 24, interface circuit 30 and bus 28.

The memory devices in slave device 18 are typically not synchronous with processor 26 or processor bus 28 because the memory devices are not driven by processor clock 32. Therefore, bus 24, which in this embodiment is referred to as an input/output (I/O) bus is not synchronous with processor bus 28.

In fact, I/O bus 24 typically has specifications for timing and functional control which are vastly different than, and therefore incompatible with, signals provided by processor bus 28 along signal paths 34, 36, and 38. The specifications for I/O bus 24 are commonly set out in a written specification provided by the manufacturer or designer of I/O bus 24. Therefore, bus interface circuit 30 is provided to facilitate communication between processor bus 28 an I/O bus 24.

Interface circuit 30 accepts at its input the control, address, and data signals along paths 34, 36, and 38 from processor bus 28. Further, interface circuit 30 accepts at its input a clock signal from clock 32. In response to the instructions received from processor 26, through processor bus 28, interface circuit 30 provides outputs which follow the logical and timing cycle specified for I/O bus 24 in the written specification provided by the manufacturer or designer of I/O bus 24. Interface circuit 30 provides these outputs along signal paths 46, 48, and 50, respectively.

For example, when processor 26 needs to access a certain portion of the memory in slave device 18, processor 26 provides a data request (e.g. signals requesting that a read cycle be performed on the memory devices in slave device 18), through processor bus 28, to bus interface circuit 30. Since processor 26 is driven by processor clock 32, and since I/O bus 24 is not synchronous with clock 32, the data request provided to bus interface circuit 30 is, in all likelihood, incompatible with I/O bus 24. Therefore, bus interface circuit 30 converts the data request from processor bus 28 into a read cycle compatible with bus 24. The read cycle is provided, through bus 24, to the memory devices on slave device 18 to access data from those memory devices.

Bus interface circuit 30 provides the read cycle at its outputs in the form of a plurality of logical output states. The duration of each logical output state on the outputs of bus interface circuit 30 is timed properly so that the read cycle meets the logical and temporal specifications for I/O bus 24. While the function of bus interface circuit 30 has been described with reference to a read cycle, the function of providing communication between processor bus 28 and I/O bus 24 is performed by bus interface circuit 30 for any number of desired operations including write operations.

2. Prior Art BUS Interface Circuits

In the past, interface circuits such as bus interface circuit 30 were designed in the form of a state machine to convert processor requests into output cycles based on a clock signal having a given frequency. A variety of prior art state machines are described in some detail in *An Engineering Approach To Digital Design*, pp. 290–295, by William I. Fletcher published by Prentice-Hall, Inc. of Englewood Cliffs, N.J. 07632. Those pages are hereby incorporated by reference.

Figure 2:
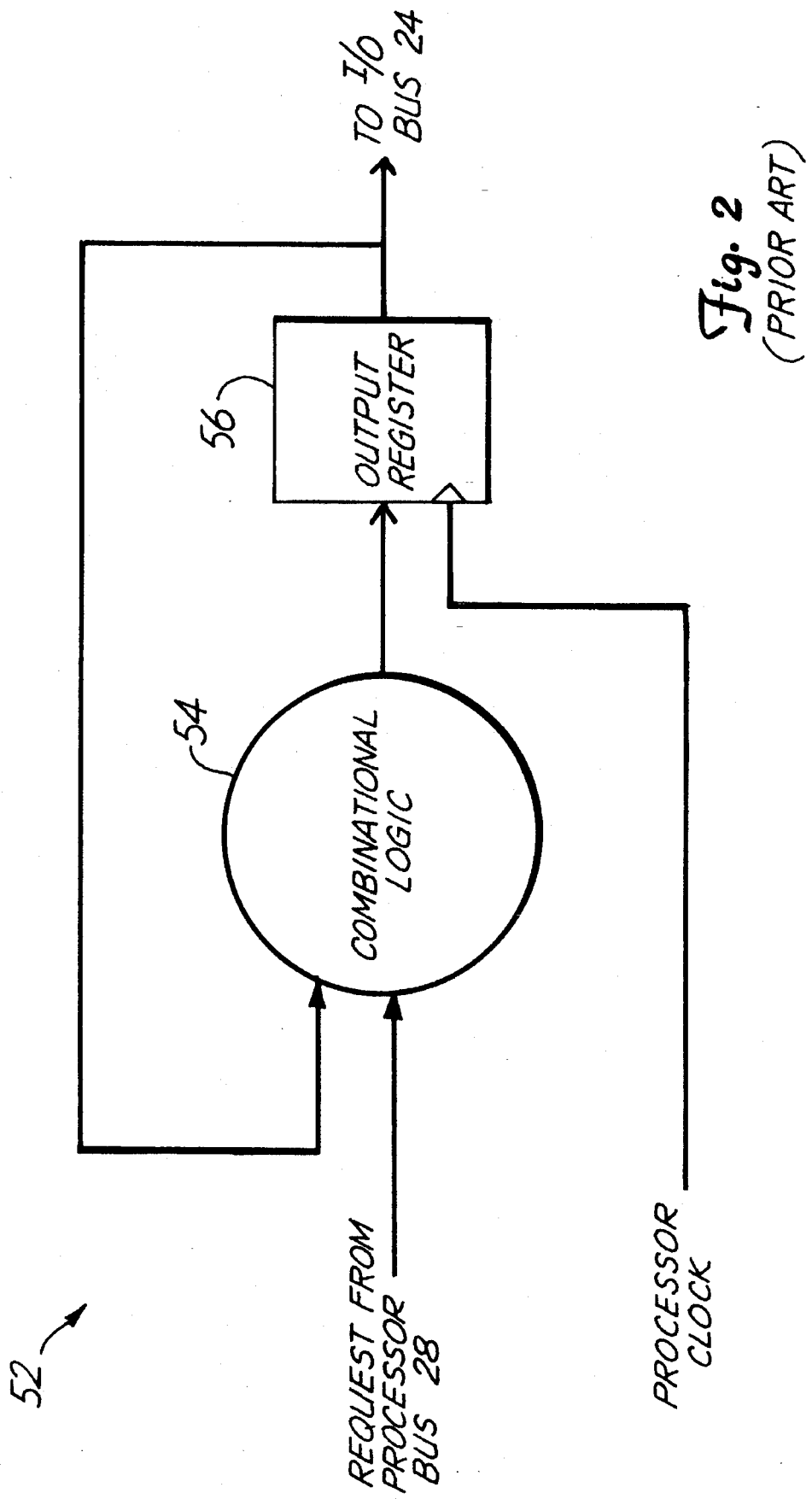
FIG. 2 is a block diagram of a typical state machine.

FIG. 2 shows one example of a prior art bus interface circuit 52. The state machine of prior art bus interface circuits included combinational logic 54 and output register 56. The processor request would be provided to combinational logic 54. Based on the processor request, combinational logic 54 would provide a logical output to output register 56. Output register 56 would, in turn, be clocked by processor clock 24 and the outputs from combinational logic 54 would be provided through output register 56 as the logical outputs to I/O bus 24. The logical outputs would also be fed back to combinational logic 54 to determine the next logical output state to be provided to I/O bus 24. On the next processor clock pulse, the new logical output state would be clocked through output register 56 to I/O bus 24.

By using bus interface circuit 52, the logical output states provided to I/O bus 24 were directly tied to the processor clock frequency of processor 32 and to the logical functions designed into combinational logic 54. While combinational logic 54 can be designed to accommodate the frequency of processor clock 32, if that frequency changed, combinational logic 54 would need to be redesigned to accommodate the new processor clock frequency. This concept can be further illustrated using timing diagrams.

Figure 3:
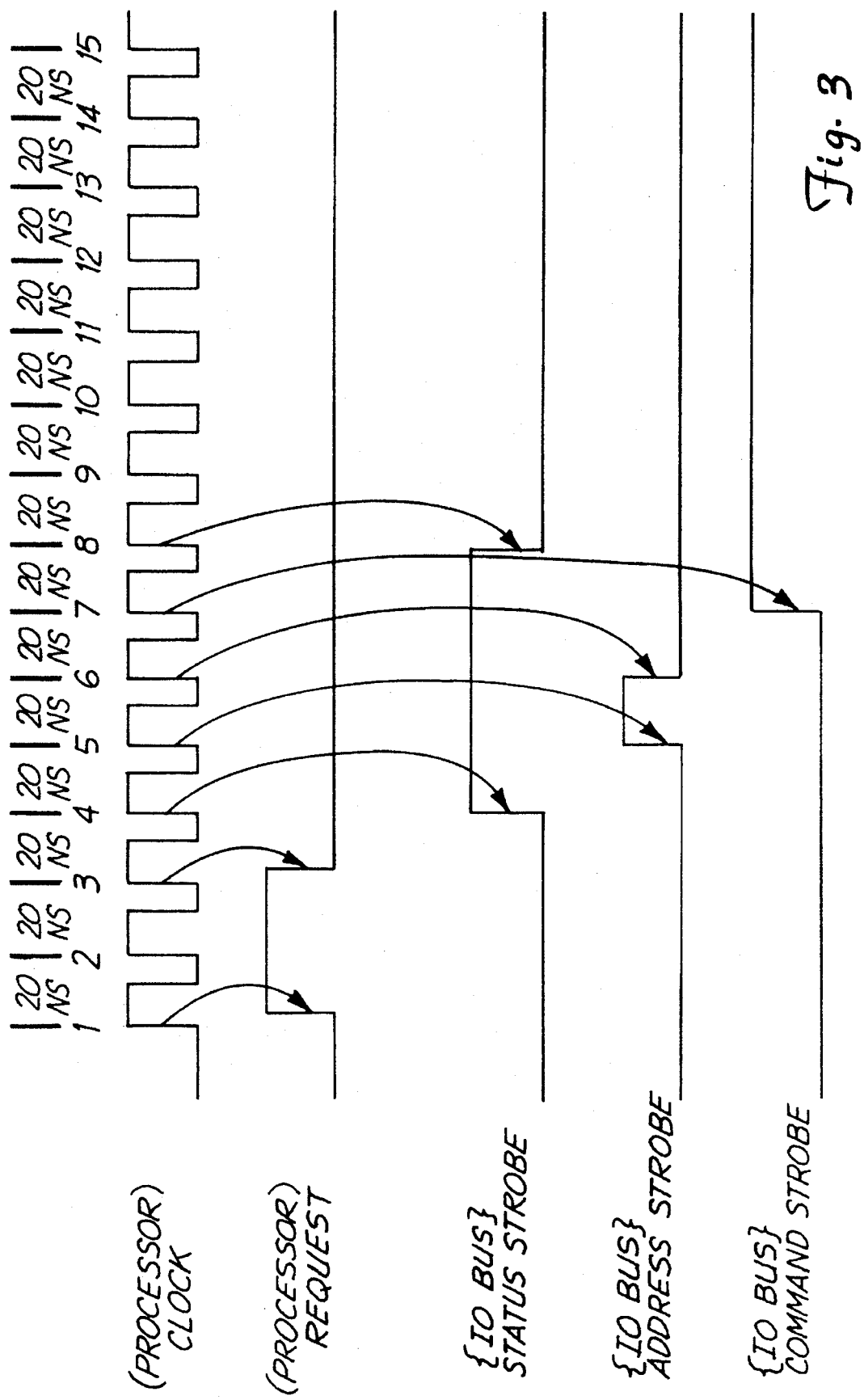
FIG. 3 is a timing diagram associated with a bus interface circuit having a 20 ns processor clock.

FIG. 2A is a timing diagram associated with bus interface circuit 52 shown in FIG. 2. The clock period of the processor clock is 40 ns. FIG. 3 is a timing diagram associated with bus interface circuit 52 where the clock period is 20 ns. In FIG. 2A a processor request is initiated by processor 26. The processor request is generically indicated by a Request signal which lasts for two clock pulses. The Request signal is asserted high and begins with the rising edge of the first clock pulse and ends with the rising edge of the third clock pulse. A typical processor request may involve more than one signal. However, for the sake of clarity, the processor request shown in FIG. 2A is represented by a single signal.

In response to the processor Request signal, bus interface circuit 52 provides three output signals. Those signals include a Status Strobe signal, an Address Strobe signal, and a Command Strobe signal. The required logical state of the three outputs in order to perform a read cycle is specified by the specification for I/O bus 24. The specification ensures that the three signals reach the memory devices in slave device 18 in the proper state and with proper timing in order the achieve the desired request from processor 26. Thus, combinational logic 54 is designed to provide the three outputs as shown in FIG. 2A. The Status Strobe goes high (becomes asserted) with the rising edge of the fourth clock pulse. The Address Strobe signal goes high with the rising edge of the fifth clock pulse and goes low (becomes de-asserted) with the rising edge of the sixth clock pulse. The Command Strobe signal goes high with the rising edge of the seventh clock pulse. Finally, the Status Strobe returns to a logic low level with the rising edge of the eighth clock pulse.

Typically, a specification which defines I/O bus 24 provides that the Status Strobe, Address Strobe, and Command Strobe signals must be provided in the appropriate logical states within a minimum or maximum time period. The time period is entirely unrelated to the period of the processor clock signal. For example, a typical specification defining I/O bus 24 would state that the Address Strobe signal can only become asserted (go to a logic high level) at least 40 ns after the Status Strobe becomes asserted. Then, the Address Strobe must become de-asserted at least 80 ns before the Status Strobe becomes de-asserted. In addition, the specification defining I/O bus 24 would typically state that the Command Strobe must become asserted at least 40 ns prior to the time that the Status Strobe becomes de-asserted. Based on such specifications, combinational logic 54 is designed so that when processor 26 requests such a cycle, the output signals from the bus interface circuitry 52 are provided at the appropriate logic levels and at the appropriate times given the period of the processor clock signal.

However, if a new generation of processor chip is manufactured, and the new chip runs twice as fast as the old processor chip (i.e., the process clock has a period of 20 ns), the new chip would not work with the old bus interface circuit 52. The result of using the new processor with the old bus interface circuit 52 is illustrated by the timing diagram shown in FIG. 3. In essence, since combinational logic 54 is designed for a given processor clock period, all of the output signals move through the desired cycle twice as fast since the processor clock is twice as fast.

In other words, the Status Strobe signal still becomes asserted with the rising edge of the fourth clock pulse and de-asserted with the rising edge of the eighth clock pulse. In addition, the Address Strobe signal still becomes asserted with the rising edge of the fifth clock pulse and becomes de-asserted with rising edge of the sixth clock pulse. Finally, the Command Strobe still becomes asserted with the rising edge of the seventh clock pulse. Even though the three signals are still controlled by the same clock pulse, they violate the specification for I/O bus 24. The Address Strobe, for example, becomes asserted 20 ns after the Status Strobe signal became asserted. This violates the minimum time separation between the two signals specified as 40 ns. The same is true for the other timing specifications which define I/O bus 24. Therefore, prior art bus interface circuit 52 no longer works with the new generation processor and the bus interface circuit must be redesigned.

Further, if, in the new generation processor, the logic of the request signal changes, this will also cause a problem. The logic functions set out in combinational logic 54 are set. Therefore, if the input request signals change, the outputs of combinational logic 54 will also change. This change in logical output states will cause interface circuit 52 to be incompatible with the I/O bus specification.

3. The Present Bus Interface Circuit a. The Output cycle

The present invention overcomes the problems associated with changing processor specifications and relatively static I/O bus specifications. The present invention recognizes that the functional or logical output state of the signals from bus interface circuit 30 are separable from the timing aspects of the logical output states.

Depending upon the type of access which processor 26 is trying to gain to the slave devices, or depending on the type of manipulation which processor 26 is attempting, the outputs of bus interface circuit 30 must cycle through a plurality of logical states. Each logical state must exist for a duration of time specified by the specification for I/O bus 24. Such a sequential cycle of outputs from bus interface circuit 30 can be referred to generically as an output cycle, and may specifically be a read operation (or read cycle) or a write operation or a any type of communicative cycle.

Figure 4:
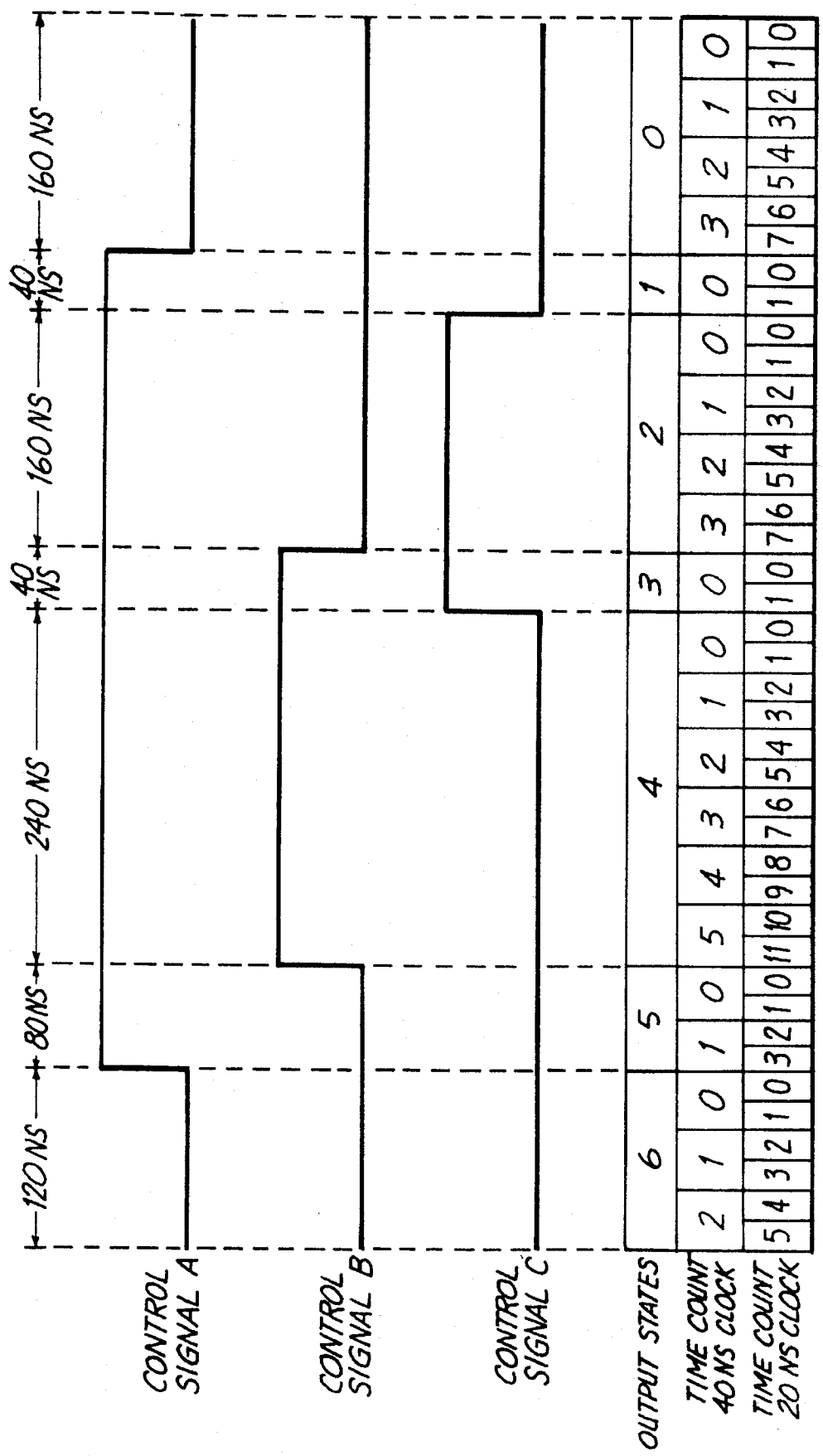
FIG. 4 is a timing diagram associated with a bus interface circuit of the present invention.

Each specific cycle can be broken into a finite number of states in which the output signals must exist. For example, FIG. 4 is a timing diagram showing three signals which are designated, for the sake of simplicity, as control signal A, control signal B, and control signal C. If, for example, during a read cycle, control signals A, B, and C must go through the output cycle shown in FIG. 4 in order to accomplish the desired task, then such a cycle can be broken into seven logical output states. The seven logical output states are indicated in FIG. 4 as output states 0–6.

In state 6, all of control signals A, B, and C are in a de-asserted (i.e., logic low) position. In state 5, control signal A becomes asserted and control signals B and C are still de-asserted. In state 4, control signals A and B are asserted but control signal C remains de-asserted. In state 3, all three control signals A, B, and C are asserted. In state 2, control signals A and C are asserted while control signal B is de-asserted. In state 1, control signal A is asserted and control signals B and C are de-asserted. Finally, in state 0, all three signals return to the de-asserted position.

While the control signals shown in FIG. 4 are labeled A, B, and C, and while the specific communicative duty which they perform is not specified, it will be understood that such signals could be any signals required by I/O bus 24 to accomplish any manipulative or communicative task. For the sake of simplicity, the cycle shown in FIG. 4 will simply be referred to as an output cycle. Any desired cycle can be similarly broken down into a plurality of states in the same manner.

b. Functional Block Diagram of Bus Interface Circuit 30

The present invention recognizes that, not only can an output cycle be broken down into a finite number of logical output states, each state has a required duration. The duration is specified by the specification for I/O bus 24.

The present invention separates bus interface circuit 30 into one portion which determines the desired logical output states for the output cycle requested by processor 26, and a second portion which assigns a number of clock pulses to each logical output state to achieve the desired duration for each state, and to thereby achieve proper timing for I/O bus 24. This is indicated more clearly in FIG. 5.

FIG. 5 shows a more detailed block diagram of bus interface circuit 30 shown in FIG. 1. Bus interface circuit 30 of the present invention includes processor request interpreter 58, logical controller 60, timing controller 62, timing parameter register 64, and output register 66.

In operation, bus interface circuit 30 is initialized prior to undertaking any requests from processor 26. During initialization, timing parameter register 64 is provided with timing data which is indicative of the period of the processor clock 32 being used with the specific type of processor 26 installed in master device 12.

After initialization, and when processor 26 desires to perform some operation requiring communication with, for example, slave device 18, processor 26 provides a processor request signal to processor request interpreter 58 through processor bus 28. Based on the request received from processor 26, processor request interpreter 58 provides a cycle input signal to logical controller 60 and timing controller 62. This is indicated by arrows 68 and 70. The cycle input signal indicates to logical controller 60 and timing controller 62 the desired output cycle which bus interface circuit 30 is to provide to I/O bus 24. Based on the cycle input signal, logical controller 60 determines which logical output states are required at the output of bus interface circuit 30. Timing controller 62 determines the duration that each logical output state in the desired output cycle must have in order to meet the specification for I/O bus 24.

Based on the timing parameter signals received from timing parameter register 64, and based on the specific output cycle being executed by bus interface circuit 30, timing controller 62 provides control signals to logical controller 60. This is indicated by arrow 72. The control signals provided by timing controller 62 control logical controller 60 so that logical controller 60 only provides the next logical output state of the output cycle to output register 66 after the current logical output state has been in place for a desired minimum duration. In essence, based on the particular output cycle being executed, and based on the timing data received from timing parameter register 64, timing controller 62 provides control signals (indicated by arrow 72) to logical controller 60 which cause an adequate number of pulses of the processor clock 32 to be assigned to each logical output state from logical controller 60 so that the output cycle provided to I/O bus 24 meets the specification requirements of I/O bus 24.

The signals provided by timing controller 62 are hereinafter referred to as intermediate state signals. The intermediate state signals are also provided to processor request interpreter 58. This is indicated by arrow 74. Based on the intermediate state signals received from timing controller 62, processor request interpreter 58 indicates to processor 26, through processor bus 28, when the desired output cycle has been completed. Processor request interpreter 58 then awaits another processor request from processor 26. This "handshaking" is indicated by arrow 76.

Output register 66 is also provided. Output register 66 synchronizes the output of logical controller 60 in order to avoid glitches or spurious signal anomalies being provided to I/O bus 24.

In addition, bus interface circuit 30 also receives return signals from I/O bus 24. This is indicated by arrow 71 and dashed arrow 73. The return signals typically include information representative of a condition of slave device 18. The return signals are provided to logical controller 60 to modify subsequent functional behavior of bus interface circuit 30 to achieve appropriate handshaking with I/O bus 24 and slave device 18. The return signals may also be provided to timing controller 62 to modify subsequent timing behavior of bus interface circuit 30.

c. Timing Controller 62

Figure 6:
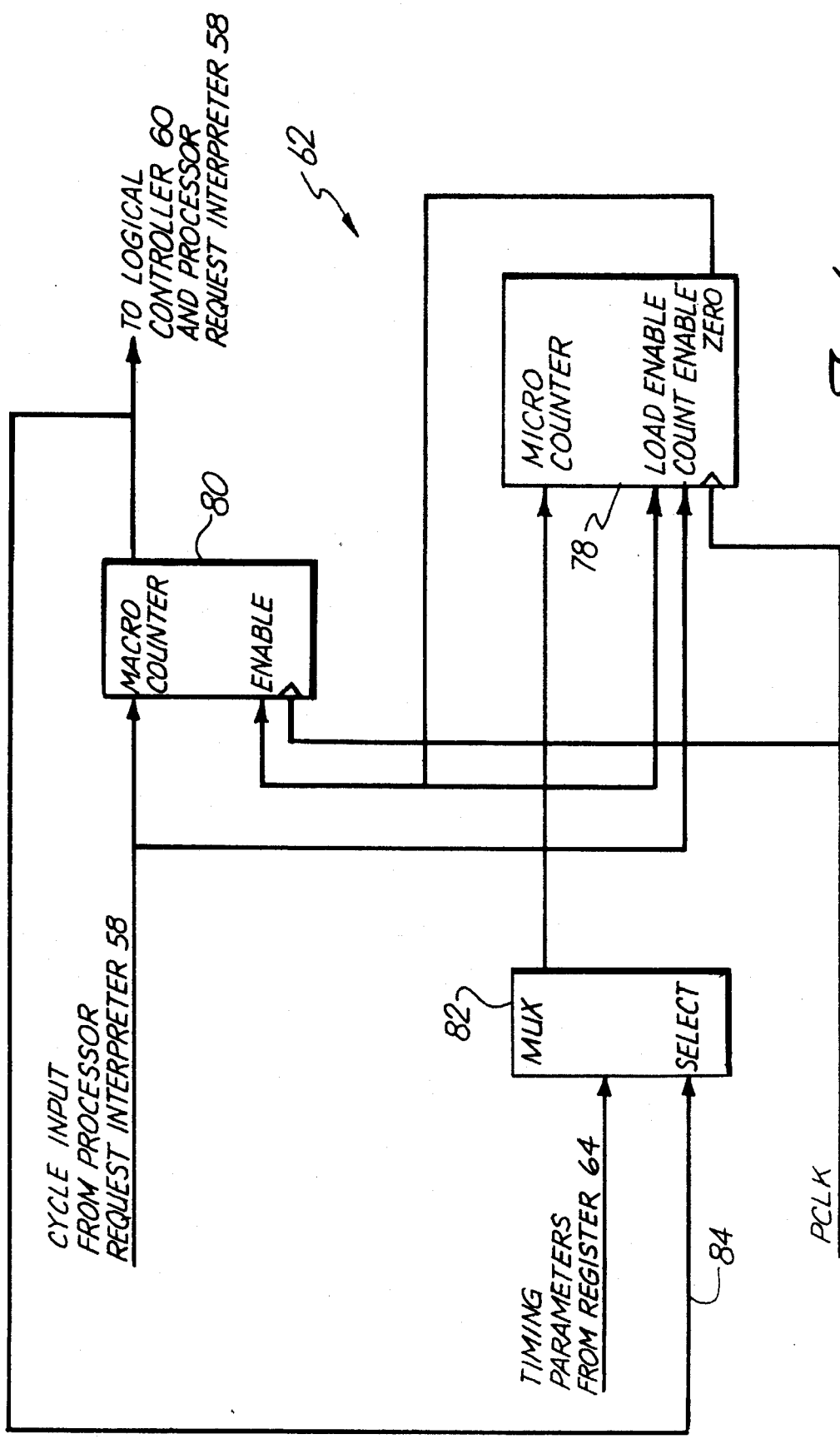
FIG. 6 is a block diagram of the timing controller shown in FIG. 5.

FIG. 6 shows a more detailed block diagram of one embodiment of timing controller 62. Timing controller 62 includes microcounter 78, macrocounter 80, and multiplexor 82. Macrocounter 80 has, as its input, the cycle input signal from processor request interpreter 58. The output of macrocounter 80 provides the intermediate state signals to logical controller 60 and to processor request interpreter 58. The intermediate state signals are also provided to the select input of multiplexor 82. This is indicated by arrow 84. Multiplexor 82 has, at its input, the timing parameters from timing parameter register 64 shown in FIG. 5. Multiplexor 82 provides, at its output, the inputs selected by the intermediate state signals provided by macrocounter 80. The output of multiplexor 82 is provided to the input of microcounter 78. The count enable input of microcounter 78 is coupled to the output of processor request interpreter 58. Microcounter 78 also has a zero output which indicates when it has reached a zero count. The zero output of microcounter 78 is provided to the count enable input of macrocounter 80 and is also fed back to the load enable input of microcounter 78.

In operation, macrocounter 80 is initially loaded, based on the cycle input from processor request interpreter 58, with a number which represents the total number of logical output states that exist in the requested cycle. For instance, with the output cycle shown by the timing diagram in FIG. 4, there are a total of seven logical output states. Thus, if processor 26 requests an operation requiring the output cycle shown in FIG. 4, macrocounter 80 is loaded to the number 6.

Based on the total number of states loaded into macrocounter 80, multiplexor 82 selects from a number of timing parameters provided by timing parameter register 64. Those timing parameters represent the total number of clock pulses of the processor clock (PCLK) which must be assigned to logical output state number 6 in the output cycle in order for that state to obtain its minimum duration. Since microcounter 78 initially contains the number zero, its zero output enables it to be loaded with the information provided at the input of microcounter 78. The number of clock pulses which must be assigned to state 6 is consequently loaded into microcounter 78.

Referring, for example, to FIGS. 4 and 6, if the processor clock has a 40 ns period, macrocounter 80 is first loaded to the number 6 since there are a total of 7 states in the requested output cycle. The output of macrocounter 80 is provided to the select input of multiplexor 82. Since the timing parameters in timing parameter register 64 are provided based on the period of the processor clock, the output of macrocounter 80 selects the number 2 from the timing parameter inputs to multiplexor 82 because in order to meet the timing specifications shown in FIG. 4, three 40 ns clock pulses must be assigned to state 6 of the desired output cycle. Thus, microcounter 78 is loaded to the number 2. The output of macrocounter 80 is provided, in turn, to logical controller 60. Based on the output of macrocounter 80, logical controller 60 provides, at its output, three logical low signals on control signal lines A, B, and C. The output from processor request interpreter 58 provides an enable signal to the count enable input of microcounter 78. Thus, with the next clock pulse, microcounter 78 begins to count down with each count of PCLK. When microcounter 78 counts from 2 to 0 (after 120 ns) the zero output of microcounter 78 enables macrocounter 80 to count down. With the next clock pulse on PCLK, macrocounter 80 counts from 6 to 5.

With the new output of macrocounter 80 being 5, logical controller 60 provides a new logical output state where control signal A is asserted (in a logical high position) and control signals B and C are de-asserted. Also, the outputs of macrocounter 80 select a new set of timing parameters from timing parameter register 64 at multiplexor 82. Since the zero output from microcounter 78 now enables microcounter 78 to be loaded, the new timing parameters are loaded into microcounter 78. The new timing parameters are the number 1, since two 40 ns clock pulses must be assigned to state 5, and microcounter 78 is loaded to the number 1. As microcounter 78 counts from 1 to 0 with each count of PCLK (after 80 ns) the zero output of microcounter 78 again enables macrocounter 80 to decrement by one count. Thus, the new output of macrocounter 80 decrements to 4.

The new output is provided to logical controller 60 which provides a new logical output state (control signals A and B high and control signal C low) to output register 66. The output of macrocounter 80 also selects new timing parameters from timing parameter register 64 through multiplexor 82. The new timing parameters correspond to the fourth state in the desired output cycle and are therefore the number 5. Thus, the number 5 is loaded into microcounter 78. Microcounter 78 then begins to count down with each count of PCLK. After microcounter 78 reaches 0 (after 240 ns) the zero output of microcounter 78 again enables macrocounter 80 to decrement by 1 count.

This process continues throughout the entire seven states in the output cycle until the entire output cycle is completed. Once the output cycle is completed, the intermediate state signals provided by macrocounter 80 to processor request interpreter 58 cause processor request interpreter 58 to initiate a handshake signal 76 with processor 26 through processor bus 28. This indicates to processor 26 that the desired output cycle has been completed and that a new request can be initiated.

BUS interface circuit 30 operates identically no matter what the period of the processor clock 32. The only things which change are the timing parameters loaded into timing parameter register 64 upon initialization of the system.

For example, FIG. 4 also shows the necessary timing parameters if the processor clock has a 20 ns period. To accomplish the identical output cycle as that accomplished with a processor having a clock with a 40 ns period, the timing parameters simply need to be doubled. Thus, rather than requiring microcounter 78 to count three clock pulses in logical output state 6, microcounter 78 must count 6 clock pulses before allowing logical controller 60 to change states. Further, microcounter 78 must count 4 clock pulses rather than 2 while the outputs are in logical output state 5. Rather than counting 6 clock pulses in state 4, microcounter 78 must count 12 pulses, and so on. Thus, timing parameter register 64 must simply be loaded with the proper values based on the speed of clock 32.

It should be noted that the examples given in the present specification are primarily illustrative. Thus, while FIG. 6 shows two interleaved counters (microcounter 78 and macrocounter 80) and one multiplexor (multiplexor 82) it may be necessary in some implementations, with a large number of output cycles, to have a larger number of nested counters. In addition, several multiplexors may be needed to implement any specific application. Also, while the embodiment of timing controller 62, shown in FIG. 6, includes counters and a multiplexor, timing controller 62 could be implemented using a variety of other means including programmable array logic.

Logical controller 60, in the preferred embodiment, is a memory device wherein the cycle input signal provides a portion of the address to the memory device and the intermediate state signals from timing controller 62 provide the remainder of the address signals. Logical controller 60 can be a read only type memory (ROM) or it can be a random access type memory (RAM). The advantages of having a RAM device are that the functional equations provided by logical controller 60 can then be rewritten upon each initialization of the system. This essentially provides a universal type system where not only the timing parameters can be changed whenever desired, but the functional equations provided at the output of the bus interface circuitry can also be changed as desired. Such a system is highly flexible and can be adapted to accommodate not only changes in processor speed and function, but also changes in the speed and function of the I/O bus.

d. Adaptable State Generator 90

Figure 7:
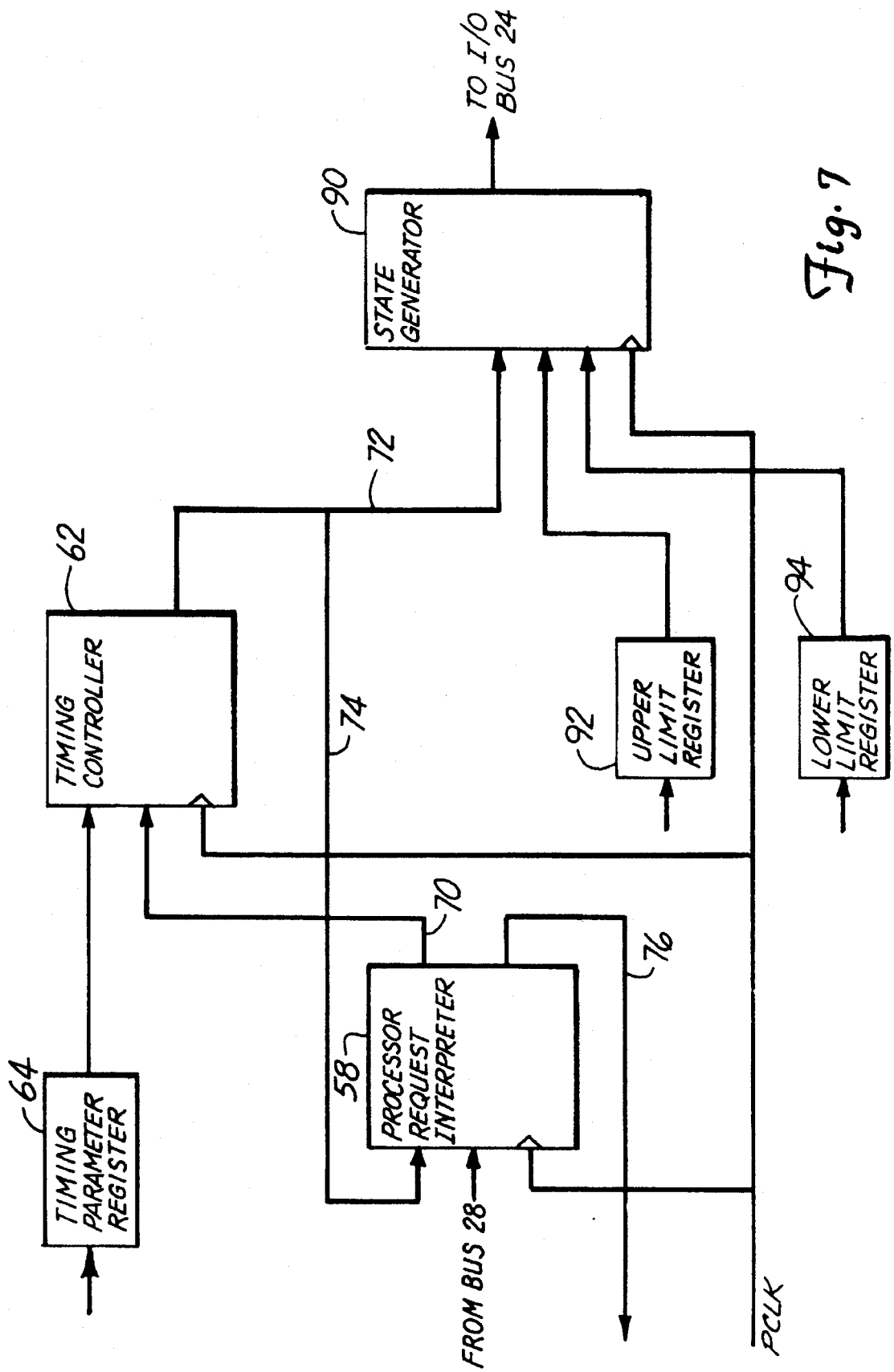
FIG. 7 is a block diagram of a state machine having variable timing and logical functions.

FIG. 7 shows another aspect of the present invention. FIG. 7 is a block diagram having several features similar to those shown in FIG. 5, and correspondingly numbered. FIG. 7 includes processor request interpreter 58, timing controller 62 and timing parameter register 64. However, FIG. 7 also includes adaptable state generator 90, upper limit register 92 and lower limit register 94. Processor request interpreter 58, timing controller 62 and timing parameter register 64 are operated in substantially the same manner as that described with reference to FIGS. 5 and 6.

However, state generator 90 operates somewhat differently than logical controller 60. State generator 90 takes, as its input, the output control signals from timing controller 62, as well as the output from upper limit register 92 and lower limit register 94.

Upper and lower limit registers 92 and 94 contain an upper limit parameter and a lower limit parameter for each output signal provided at the output of state generator 90. The limit parameters are boundaries which define a range for each corresponding output signal. That range is compared by state generator 90 to the control signals (or output count) provided by timing controller 62. If the output count from timing controller 62 is within the range defined by the upper and lower limit parameters contained in registers 92 and 94, then state generator 90 provides the corresponding output signal in a first logical state. However, if the output count provided by timing controller 62 is not within the range defined by the upper and lower limit parameters, then state generator 90 provides the corresponding output signal in a second logical output state.

This operation can be better illustrated with reference to the timing diagram shown in FIG. 4, as well as the boundary limit table shown in FIG. 4A. In order to provide the output cycle shown in FIG. 4, state generator 90 must provide three output signals (control signals A, B and C) with the timing shown in FIG. 4. The output count provided by timing controller 62 corresponds to the output states shown in FIG. 4. In other words, timing controller 62 acts as a counter which counts from 6 to 0 and provides that output count to state generator 90. By programming the upper and lower limit registers, 92 and 94, appropriately, the logical output states can be adequately determined.

FIG. 4A shows that upper limit register 92 has been programmed with an upper limit for control signal A of 5. Lower limit register 94 has been programmed with a lower limit for control signal A of 1. The upper and lower limits for control signal B are 4 and 3, respectively, and the upper and lower limits for control signal C are 3 and 2, respectively. Thus, as timing controller 62 provides the output count from 6 to 0, state generator 90 compares the output count to the upper and lower limits stored in registers 92 and 94 for each output signal. If the output count is within the range defined by the boundaries, state generator 90 asserts the corresponding output signal. If the output count is not within the range defined by the boundaries, state generator 90 deasserts the signals.

The initial output count provided by timing controller 62 to state generator 90 is 6. That count is outside of all the boundaries for all of the output signals. State generator 90 consequently deasserts all three signals, A, B, and C.

Then, when timing controller 62 eventually provides a decremented output count (count 5) to state generator 90, state generator 90 again compares the output count with the boundaries defined by the boundary limit set in registers 92 and 94. As FIG. 4A shows, the count 5 is within the boundaries set for control signal A. Thus, state generator 90 asserts control signal A upon receiving the output count 5. Count 5 is still outside the ranges defined for control signals B and C and those control signals remain deasserted.

When timing controller 62 provides the next count (count 4) to state generator 90, it is determined that 4 is within the boundaries defined for both control signals A and B. Thus, state generator 90 retains control signal A in the asserted position and causes control signal B to move from the deasserted position to the asserted position. However, count 4 is still outside the range provided in the upper and lower limit registers, 92 and 94, for control signal C, thus state generator 90 retains control signal C in the deasserted position. With each subsequent output count provided by timing controller 62, state generator 90 performs the desired comparisons and provides the output signals A, B and C, in the appropriate states.

With this configuration, not only can the duration of each state be programmed using timing controller 62, but the various logical output states can be changed, manipulated and controlled simply by reprogramming upper and lower limit registers 92 and 94. Therefore, should new logical output states be required, or should the input signals change logically, that can be compensated for simply by reprogramming upper and lower limit registers 92 and 94, respectively.

4. Adaptable State Machine 95

Figure 8:
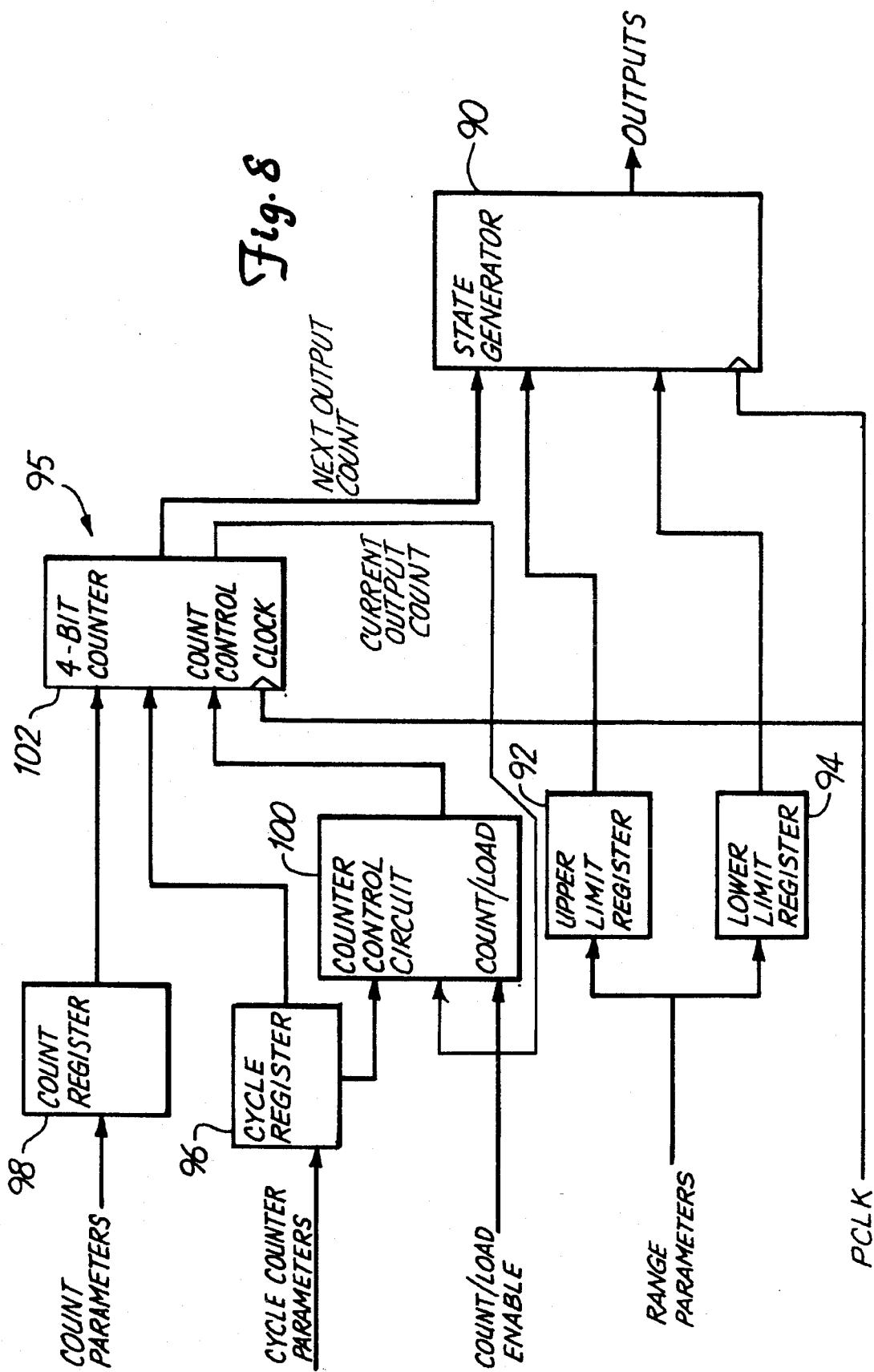
FIG. 8 is a block diagram of a second embodiment of a state machine having variable logical and timing functions.

FIG. 8 shows another embodiment of the present invention in which state machine 95 utilizes state generator 90 and upper and lower limit registers 92 and 94, respectively. State machine 95 also includes cycle register 96, counter register 98, counter control circuit 100 and 4-bit counter 102.

Cycle register 96 and counter register 98 hold cycle count parameters and count parameters which are provided by, in this preferred embodiment, controller 26. The parameters can be provided by a different parameter controller device or entity, essentially any suitable device appropriately coupled to I/O bus 24. However, for the sake of simplicity, the present description will continue describing the present embodiment in which the parameters are provided by controller 26. Registers 96 and 98 provide their outputs to counter control circuit 100 and 4-bit counter 102. Also, control signals, which include Count Enable and Load Enable signals are provided by controller 26 to counter control circuit 100. The control signals can also be provided by any other appropriately coupled device.

Counter control circuit 100 provides output control signals to 4-bit counter 102 which, in turn, provides a next output count to state generator 90 and a current output count to counter control circuit 100. Based on the parameters provided by cycle register 96, the current output count provided by counter 102, and based on the Count Enable and Load Enable control signals provided by processor 26, counter control circuit 100 controls 4-bit counter 102 to either count up, count down, remain the same for another clock pulse, or to be loaded with a new count provided from counter register 98 or cycle register 96.

4-bit counter 102 provides the next output count to state generator 90, as controlled by counter control circuit 100. State generator 90, upper limit register 92 and lower limit register 94 all perform essentially the same functions as those described with reference to FIG. 7. The only difference is that state generator 90 is comparing the next output count from 4-bit counter 102 with boundaries set in upper and lower limit registers 92 and 94, rather than comparing the output count from timing controller 62 with those boundaries. Hence, state generator 90 provides the output signals based on the next output count from counter 102, and based on the parameters from registers 92 and 94.

Figure 9:
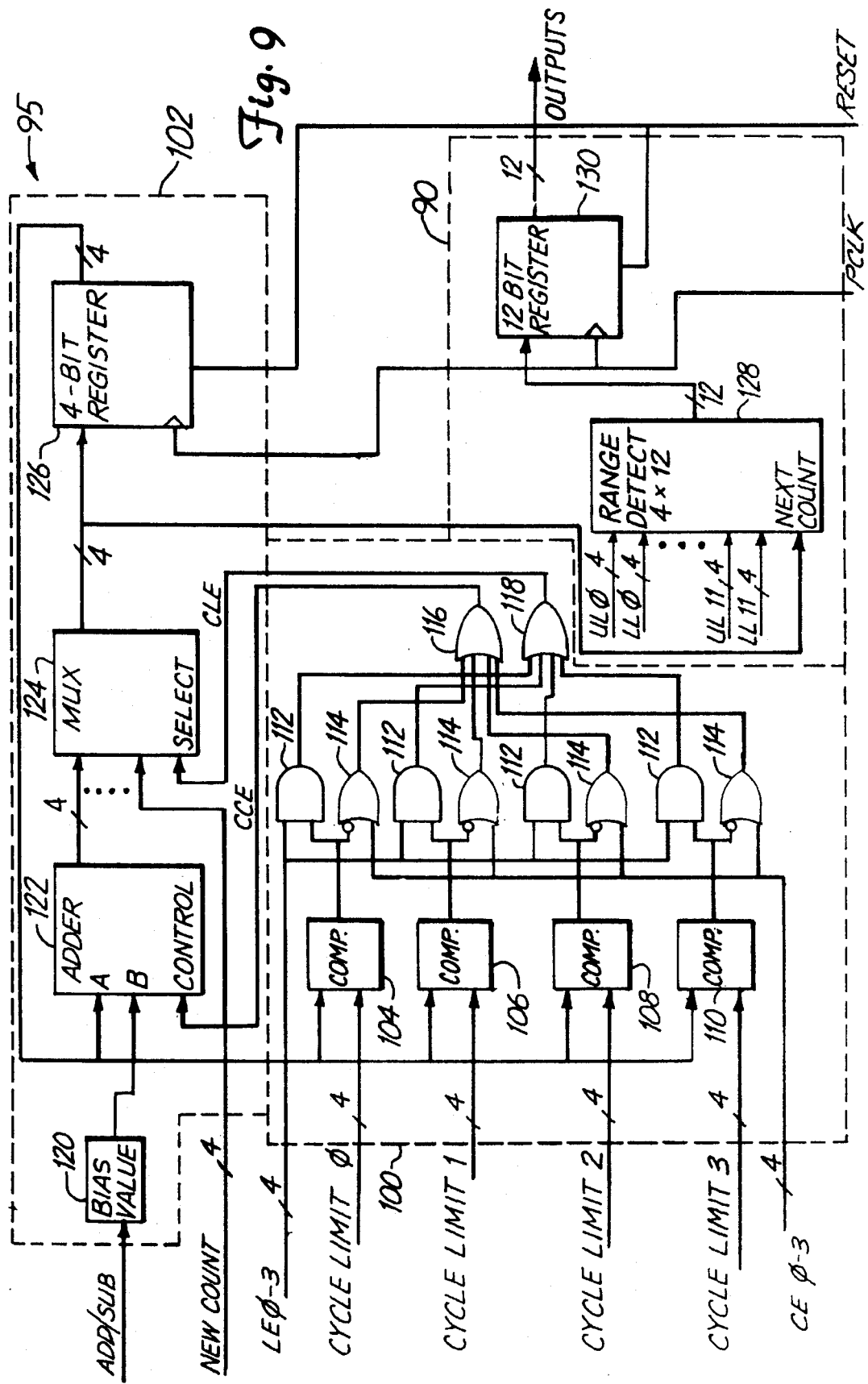
FIG. 9 is a more detailed block diagram, partially in schematic form, of the state machine shown in FIG. 8.

FIG. 9 is a more detailed block diagram of state machine 95. Counter control circuit 100 includes comparators 104, 106, 108 and 110. Counter control circuit 100 also includes four AND gates 112, four AND gates 114 with an inverting input, and two OR gates 116 and 118, respectively.

a. Counter 102

Counter 102 includes bias value generator 120, adder 122, multiplexor 124 and four bit register 126. State generator 90 includes range detector 128 and 12-bit register 130.

In operation, four bit register 126 of counter 102 is initially loaded with an initial count value. That initial count value is fed back to adder 122. Counter control circuit provides a Counter Count Enable signal (CCE) and a Counter Load Enable signal (CLE) to counter 102. The CCE signal is provided to a control input of adder 122. This control input causes adder 122 to take the count value provided by 4-bit register 126 and either apply a bias value to it or not. The bias value is a programmable number provided by bias value generator 120. Adder 122 can apply the bias value by performing a number of different functions. For example, adder 122 can simply add the bias value, subtract the bias value, or leave the count value unchanged. In addition, if adder 122 is a wrap-around type adder, the number 15 can be added to the count value to essentially subtract 1. Any such functions can be easily implemented, depending on a particular application.

The new output value is then provided by adder 122 to multiplexor 124. A number of other count values are also provided to multiplexor 124 by cycle register 96 and counter register 98. Based on the cycle being performed, counter control circuit 100 provides the Counter Load Enable (CLE) signal to multiplexor 124. Based on the CLE signal, multiplexor 124 provides either the new count value supplied by adder 122, or another value supplied at its input. The CLE signal can be a plurality of bits so that multiplexor 124 can select among a number of different values supplied at its input. The selected value is provided to 4-bit register 126.

The value supplied to 4 bit register 126 is loaded into the register with the next clock pulse from the processor clock. Counter 102 also receives a reset signal from the controller. In this way, counter 102 can be controlled to count up or down by a designated value, remain the same for a number of clock pulses, or be loaded to a new value.

b. Counter Control Circuit 100

The output count from register 126 is not only fed back to adder 122, but is also provided to comparators 104, 106, 108, and 110 in counter control circuit 100. The output count from counter 102 is compared in each of the comparators to a set of cycle limit signals provided by cycle register 96. Depending on the type of operations to be performed by state machine 95, the cycle limit signals (Cycle Limit 0—Cycle Limit 3) will be varied.

Counter control circuit 100 also receives control signals in the form of Load Enable signals and Count Enable signals from controller 26. These control signals are combined with the output of comparators 104–110 in AND gates 112, OR gates 114, and OR gates 116 and 118. Thus, for example, if state machine 95 is performing a read cycle, cycle register 96 would be programmed with the final count of the read cycle as Cycle Limit 0. When the output count of counter 102 reaches the final count of the read cycle, the output count will be the same as Cycle Limit 0. Comparator 104 will therefore provide an asserted output to AND gates 112 and OR gates 114. If the Load Enable signal provided to AND gate 112 is also asserted, meaning that counter 102 should be loaded to a new value so that state machine 95 can perform another cycle, the output of AND gate 112 goes positive and the output of OR gate 118 also goes positive. This results in the CLE signal causing multiplexor 124 to select a new count value to be loaded into 4-bit register 126.

If none of the Cycle Limits have been reached, the output of comparators 104–110 remain low. If it is desired that counter 102 continue to count to perform the desired output cycle, the Count Enable signal is high. Thus, the output of OR gate 114 is also high resulting in the CCE signal controlling adder 102 to add or subtract the desired amount from the previous output count thereby causing counter 102 to count up or down, respectively. Further, if the output count from 4-bit register 126 does not match any of cycle limits 0–3, the output of comparators 104, 106, 108 and 110 will be low and the CCE signal will cause counter 102 to count in the desired way.

Commonly, a plurality of Load Enable signals will be provided by the controller to counter control circuit 100. Similarly, a plurality of Count Enable signals will be provided. In this way, the control signals can be provided to operate counter 102 correctly for a variety of output cycles, without reprogramming any of the Cycle Limit signals stored in the cycle register. It will also be appreciated that the CCE and CLE signals may include any number of bits. When the CLE signal includes a plurality of bits, multiplexor 124 can choose between a number of input values to be loaded into 4-bit register 126. Similarly, when the CCE signal includes a plurality of bits, a wider range of control can be exercised over adder 122.

c. State Generator 90

The next count to be provided to 4 bit register 126 is also provided by multiplexor 124 to range detector 128 in state generator 90. Range detector 128 receives the upper and lower limit signals stored in registers 92 and 94. One upper limit and one lower limit is received for each output of state generator 90.

In the example shown in FIG. 9, state generator 90 has 12 outputs. Therefore, range detector 128 receives upper limits UL 0–UL 11 and lower limits LL 0–LL 11. Upon receiving a new count from multiplexor 124, range detector 128 determines whether the next count will be within the ranges defined by the upper and lower limits for each output signal. If the next count is within the range, range detector 128 asserts the corresponding output signal. If the next count is outside of the range, range detector 128 deasserts the corresponding output signal. With the next clock pulse, the newly asserted and deasserted output signals are clocked into 12-bit register 130 and provided at the output of state generator 90.

d. Operation Of State Machine 95

Figure 10:
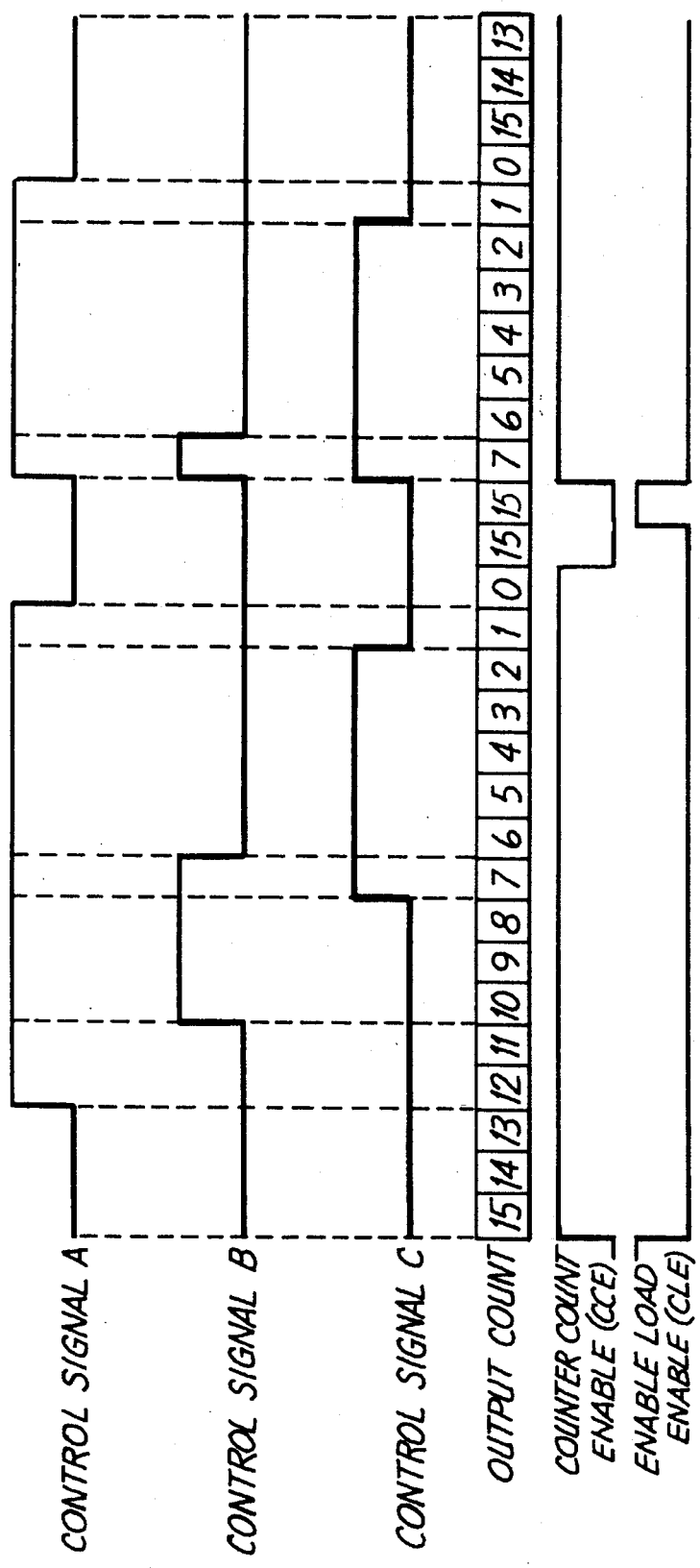
FIG. 10A is a table showing upper and lower limits for a plurality of control signals.

The operation of state machine 95, shown in FIG. 9, can probably be better understood with reference to the timing diagram shown in FIG. 10 and the table shown in FIG. 10A. At the initiation of the specific output cycle shown in FIG. 10, 4-bit register 126 is initially loaded with the value 15. Since the value 15 is outside the range defined by the upper and lower limits for each of output signals, (signals A, B, and C) all of the output signals are deasserted. As counter 102 counts down to 13, the CCE signal remains asserted and the CLE signal remains deasserted. Thus, counter 102 continues to decrement and the next output count provided to 4-bit register 126 is count 12. That count is also provided to range detector 128 in state generator 90. Since count 12 is within the range for output signal A, range detector 128 asserts output signal A and the asserted signal is clocked into register 130 with the next clock pulse.

All the output signals remain in the same state for two more counts, until counter 102 counts to 11. At that point, the count provided to range detector 128 is the count 10. Since the count 10 is within the range for output control signal B, with the next clock pulse, range detector 128 asserts output signal B, retains output signal A in the asserted position and retains output signal C in the deasserted position. State machine 95 continues to operate in this manner so long as the CCE signal remains asserted and the CLE signal remains deasserted, thereby allowing counter 102 to continue counting.

However, for the specific cycle shown in FIG. 10, after counter 102 reaches the count 0 and wraps around to the count 15, the CCE signal becomes deasserted. This causes counter 102 to stop counting and retain the same count (15) for another clock pulse. With the next clock pulse, the CLE signal becomes asserted. Such a state results, for example, when the output provided by register 126 compares with one of the cycle limits provided to comparators 104–110. If that compare corresponds with the assertion of one of the Load Enable signals LE 0–LE 3, it is time to load counter 102 with a new value. In that case, multiplexor 124 chooses a new value to be loaded into 4-bit register 126. In the present example, the new value is 7.

The new value to be loaded into 4-bit register 126 is also provided by multiplexor 124 to range detector 128. Range detector 128 determines that the value 7 is within the ranges defined by the upper and lower limits set for each of the three output signals. Thus, range detector 128 asserts all three output signals and clocks them into the 12 bit register 130 with the next clock pulse. Counter 102 then continues counting in a manner determined by counter control circuit 100, and state generator 90 continues to provide outputs accordingly.

Figure 11:
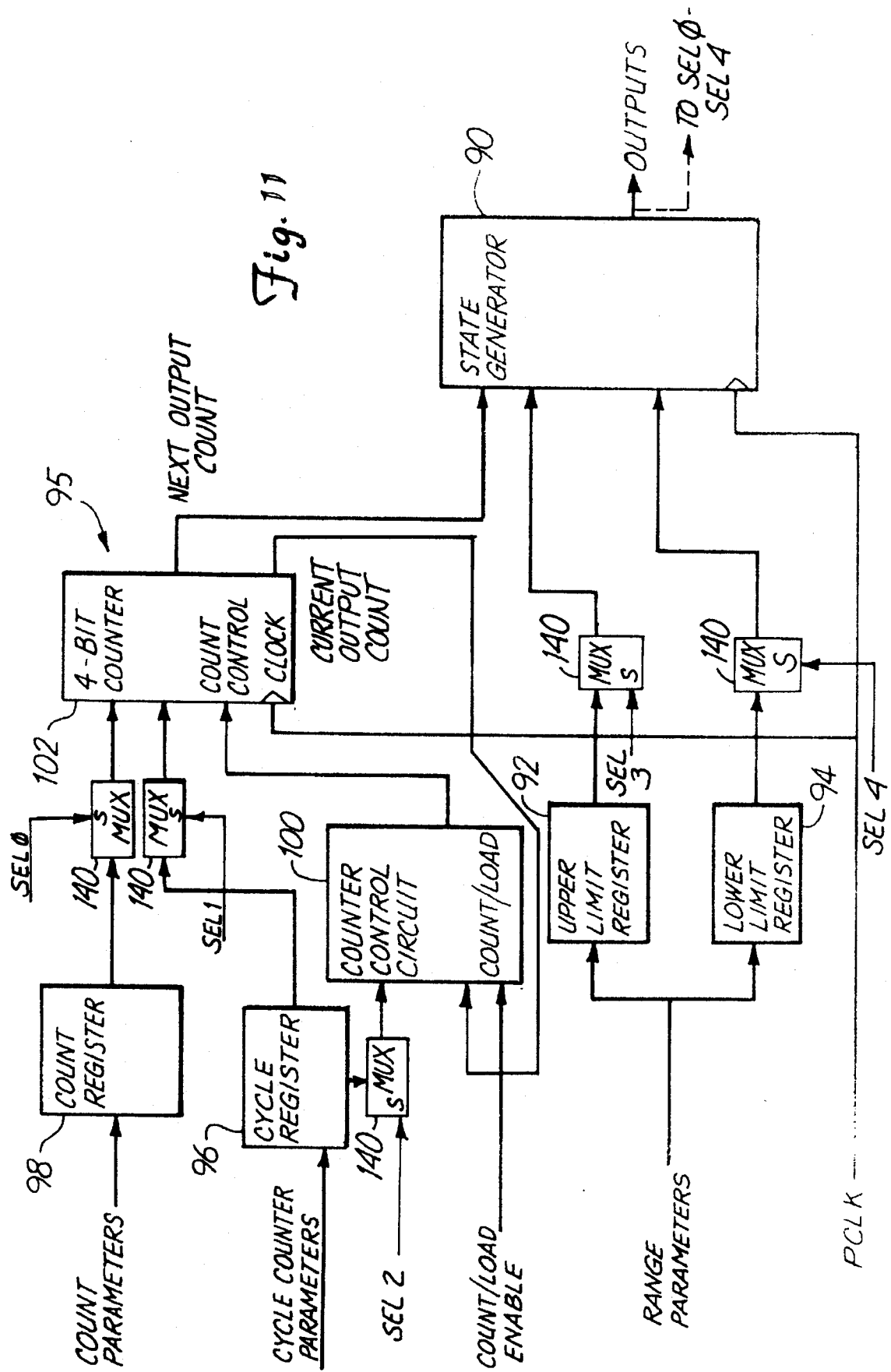
FIG. 11 is another embodiment of a state machine having variable logical and timing functions.

FIG. 11 shows another embodiment of the present invention. State machine 95, shown in FIG. 11, is identical to that shown in FIG. 8 except that multiplexors 140 have been added at the input of counter 102, at the input of counter control circuit 100, and at the input of state generator 90.

Multiplexors 140 provide a number of selectable inputs to 4-bit counter 102, counter control circuit 100 and state generator 90 so that state machine 95 achieves a greater degree of flexibility and adaptability. The multiplexors receive a variety of inputs. Selection of those inputs is done through manipulation of select signals SEL0–SEL4. Select signals SEL0–SEL4 can be provided either by processor 26, or by some other controlling entity. The select signals can be changed "on-the-fly" by the controlling entity, or they can be stored in registers so that the outputs provided by multiplexors 140 are changed with each cycle, or with each initiation procedure in which the registers are reloaded.

Multiplexors 140 coupled to 4-bit counter 102 provides a plurality of input counts. Thus, counter 102 can be loaded to one of a number of values, depending upon the value of select signal SEL1. Further, the bias value can be one of any number of values depending upon the value of select signal SEL0. Select signal SEL2 controls the cycle limit signals provided to counter control circuit 100. Thus, the cycle limit signals can be selected by changing the value of select signal SEL2. Finally, the upper and lower limits provided to state generator 90 are selectable. By changing the value of select signals SEL3 and SEL4, the upper and lower limits can be changed to provide different output signals from state generator 90.

It should be noted that, while select signals SEL0–SEL4 are shown with a single line in FIG. 11, they could be comprised of a number of select signals to control multiplexors 140 to provide one of three or more inputs. Select signals SEL0–SEL4 can also be fed back from the outputs of state generator 90. In this way, state machine 95 is a self-modifying state machine which is highly flexible and adaptable to various applications.

FIG. 12 shows a second embodiment of state generator 90. The state generator shown in FIG. 12 includes range detector 128 and 12-bit register 130. However, the state generator shown in FIG. 12 also includes AND gates 150, output enable registers 152 (shown in phantom) and output enable signals OE0–OE11.

Range detector 128 and 12-bit register 130 operate in the exact same manner as that described with reference to FIG. 9. However, with the embodiment shown in FIG. 12, an enable feature has been added. The 12 outputs of range detector 128 are provided to one input of AND gates 150. The outputs of AND gates 150 are, in turn, provided to the inputs of 12-bit register 130. Output Enable signals (OE0–OE11) are provided to the second inputs of AND gates 150. Thus, the outputs of range detector 128 are either enabled so that they rise and fall in the manner described with reference to FIG. 9 when the corresponding Output Enable signal is asserted, or they are disabled so that a low signal is provided to 12-bit register 130 when the corresponding Output Enable signal is deasserted. In the preferred embodiment, one Output Enable signal is provided for each of the outputs of range detector 128. The Output Enable signals can either be provided by processor 26, by some other controller entity, or they can be stored in output enable registers 152. This enable feature provides even greater flexibility for state machine 95 and state generator 90.

It will be appreciated that the number of outputs from state machine 95 can vary, as can the number of bits provided in counter 102. For example, counter 102 could be a 6 bit counter, an 8 bit counter or any other size counter. Similarly, state generator 90 could provide 6 outputs, 24 outputs or any other number of outputs. The corresponding changes would simply need to be programmed into the appropriate registers.

It can be seen that the various embodiments of the present state machine provide a flexible state machine which can be adapted to perform any number of output cycles. For example, simply by setting the cycle limit signals to comparators 104–110 and controlling the Load Enable and Count Enable signals appropriately, counter 102 can be set to, and can count from, essentially any value. Thus, the duration of any output state can be changed simply by changing the values in the appropriate cycle limit registers. This has the effect of changing the duration of the logical output states of state machine 95 to achieve desired adaptability and compatibility.

Further, the logical output states themselves can be changed simply by changing the upper and lower limits provided to range detector 128 in state generator 90. Thus, logical adaptability and compatibility can be obtained by simply reprogramming the upper and lower limit registers.

The present state machine is highly flexible and can be adapted to a large number of applications. For example, the present invention can be used as a direct memory access (DMA) controller. Further, the present invention can be implemented on microcontroller chips, in LON devices in controllers for appliances such as refrigerators and microwave ovens, in computerized automobiles, and in a variety of other microcontrollable devices.

Although the present invention has been described with reference to preferred embodiments, workers skilled in the art will recognize that changes may be made in form and detail without departing from the spirit and scope of the invention.

What is claimed is:

1. An interface circuit for receiving input signals from a controller and for providing a plurality of output signals in a finite number of output states as a function of the input signals, the interface circuit comprising:

a counter, controllable to count and to be loaded with a count value, the counter providing an output count;

a state generator coupled to the counter to receive the output count and providing the plurality of output signals;

storage means, coupled to the counter and the state generator for receiving the input signals from the controller and for providing counter parameters to the counter and state parameters to the state generator based on the input signals received, the counter parameters including the count value loadable into the counter, and the state parameters including parameters corresponding to each of the plurality of output signals wherein the state generator compares the output count to the state parameters and provides the output signals corresponding to the state parameters in one of the finite number of output states based on the comparison;

wherein the state parameters include a plurality of sets of range boundaries, one of said output signals corresponding to a set of range boundaries, each set of range boundaries having a first boundary and a second boundary separated from one another by a separation count defining a range, wherein the state generator compares the output count to the set of range boundaries corresponding to each output signal and wherein the state generator provides each output signal in a first state when the output count is within the range defined by the corresponding set of range boundaries; and wherein the state generator provides each output signal in a second state when the output count is outside the range defined by the corresponding set of range boundaries;

such that the state generator provides the output signals in the first state for a duration depending on the separation count and wherein the state generator provides the output signals in the first state beginning at a time that depends on a comparison between the first boundary and the output count, the output count being dependent on an initial count value loaded into the counter and cycle limit signals corresponding to a cycle to be performed.

2. The interface circuit of claim 1 wherein the controller provides counter control signals which include count control signals and load control signals to the counter and wherein the counter comprises:

a counter control circuit for receiving the counter control signals from the controller, and the counter parameters, and for controlling the counter based on the counter control signals and the counter parameters.

3. The interface circuit of claim 2 wherein the interface circuit performs a cycle in response to the input signals and wherein the counter parameters further comprise:

a plurality of sets of cycle limit signals each set corresponding to a cycle to be performed, the counter control circuit comparing the output count with the sets of cycle limit signals and controlling the counter based on the comparison such that the counter counts through a number of counts to perform the cycle.

4. The interface circuit of claim 3 wherein the counter control signals include count signals and load control signals and wherein the counter control circuit controls loading and counting of the counter based on the comparison of the output count with the sets of cycle limit signals and based on the load control signals and the count signals.

5. The interface circuit of claim 1 wherein the state generator comprises:

gating means for selectively gating the output signals based on enable signals.

6. The interface circuit of claim 1 wherein the state generator includes gating means for selectively gating the output signals based on enable parameters and wherein the storage means comprises:

enable parameter storage means, coupled to the gating means, for storing the enable parameters provided by the controller and for providing the enable parameters to the gating means to control gating of the output signals.

7. The interface circuit of claim 1 wherein the storage means comprises:

selectable storage means, coupled to the counter and the state generator for storing a plurality of sets of counter parameters and state parameters, the plurality of sets being selectable.

8. The interface circuit of claim 7 wherein one of the output signals is fed back to the selectable storage means to select among the plurality of sets of parameters.

9. The interface circuit of claim 7 wherein the controller provides select signals to the selectable storage means to select among the plurality of sets of parameters.

10. The interface circuit of claim 7 wherein a plurality of output signals are fed back to the selectable storage means to select among the plurality of sets of parameters.

11. A state machine in a computer system, the state machine receiving operation parameters, a clock signal and control signals from a parameter control device and providing output signals in logical output states to perform an operation based on the operation parameters, the clock signal and the control signals, the control signals including count control signals and lead control signals, the state machine comprising:

storage means for storing the operation parameters provided by the parameter control device, the operation parameters including timing parameters and state parameters, the timing parameters including cycle limit signals and an initial count value, and the state parameters including output signal duration boundaries associated with each output signal;

a counter, coupled to receive the clock signal and coupled to the storage means, the counter providing a counter output based on the clock signal and based on the timing parameters stored in the storage means;

a counter control circuit, coupled to the counter and to the storage means, for receiving the control signals from the parameter control device, for comparing the counter output with the cycle limit signals, and for controlling operation of the counter based on the control signals and based on the comparison of the counter output with the cycle limit signals; and state generation means, coupled to the counter and the storage means, for comparing the counter output with the state parameters and for generating the output signals in logical output states, each logical output state being provided at a time based on the comparison of the counter output with the timing parameters and having a duration based on the comparison of the counter output with the state parameters.

12. The state machine of claim 11 wherein the output signal duration boundaries comprise:

an upper range boundary corresponding to each output signal; and a lower range boundary corresponding to each output signal, the upper and lower range boundaries defining a range so that the state generation means provides the corresponding output signal in a first logical output state when the counter output is within the range and the state generation means provides the corresponding output signal in a second logical output state when the counter output is outside the range.

13. The state machine of claim 11 wherein the cycle limit signals are indicative of a value of the counter output which corresponds to an end of a cycle performed by the state machine wherein the cycle limit signals, the count control signals and the lead control signals are representative of a time during the operation being performed when the counter is to be loaded with the initial count value and when the counter is to count.

14. The state machine of claim 13 wherein the counter control circuit comprises:

means for comparing the counter output with the cycle limit signals and for controlling operation of the counter based on the comparison of the counter output with the cycle limit signals and based on the count control signals and the load control signals.

15. The state machine of claim 14 wherein the counter control circuit comprises:

means for loading the counter with the initial count value and for controlling the counter to count in response to the comparison of the counter output with the cycle limit signals, the count control signals and the load control signals.

16. The state machine of claim 11 and further comprising:

an output register, coupled to the state generation means and the clock signal, storing the output signals of the state generation means at predetermined times during successive periods of the clock signal to provide timed output signals.

17. The state machine of claim 11 wherein the storage means comprises:

selectable storage means for storing a plurality of sets of operation parameters, the plurality of sets of operation parameters being selectable.

18. State machine of claim 11 wherein the state generation means comprises:

gating means for selectively gating the output signals.

19. An apparatus in a computer system, the computer system having a controller, a parameter control device, and a clock providing a clock signal at a frequency, the apparatus receiving the clock signal and input signals from the controller and from the parameter control device and providing output signals in an output cycle based on the input signals, the apparatus comprising:

programmable storage means, coupled to the parameter control device, for receiving timing parameters and output parameters from the parameter control device and for storing the timing parameters and output parameters, the timing parameters including limit signals and a load count value and the output parameters including range signals;

counting means, coupled to the storage means, to the clock, and to the controller, for receiving the timing parameters the counting means providing a count output based on, and being variable with, the frequency of the clock signal, the count output and the timing parameters; and state generation means, coupled to the storage means, the clock and the counting means, for receiving the clock signal, the count output and the output parameters and for providing the output signals in the output cycle, the output cycle having logical states based on the output parameters and the count output;

wherein the logical states have durations that are controlled based on the output parameters, the clock signal and the count output;

wherein the logical states are provided at a time that is controlled based on the count output and the timing parameters;

the logical output states and durations being controllably variable with the output parameters.

20. The apparatus of claim 19 wherein the counting means comprises:

a counter coupled to the programmable storage means and the state generation means; and a counter control circuit coupled to the counter, the controller and the programmable storage means, the counter control circuit receiving the timing parameters including limit signals and comparing the output count to the limit signals to provide a comparison output, the counter control circuit receiving counter control signals from the controller including load enable signals and count enable signals and controlling counting and loading operations of the counter based on the load enable signals, the count enable signals and the comparison output.

21. The apparatus of claim 20 wherein the load value is loaded into the counter when the counter control circuit causes the counter to be loaded.

22. The apparatus of claim 20 wherein the state generation means comprises:

range detection means, coupled to the counter and the programmable storage means, for receiving the count output and the output parameters, for determining, based on the output parameters, whether the count output is within a range set by the range signals, and for providing the output signals based on the determination.

23. The apparatus of claim 22 wherein the output parameters comprise:

at least one range boundary corresponding to each output signal, wherein the range detection means includes means for comparing the count output to the range boundary to determine whether the count output meets the range boundary, and wherein the range detection means provides the output signals based on the comparison corresponding to each output signal.

24. The apparatus of claim 23 wherein the output parameters comprise:

a set of range boundaries corresponding to each output signal, the range boundaries defining a range corresponding to each output signal wherein the range detection means includes means for detecting whether the count output is within the range for each output signal, the range detection means providing the corresponding output signal in a first logical state when the count output is within the range and in a second logical state when the count output is outside the range.

25. The apparatus of claim 24 wherein the range detection means comprises:

an output register for providing the output signals essentially simultaneously based on the clock signal.

26. The apparatus of claim 25 and further comprising:

gating means, coupled between the range detection means and the output register, for selectively gating the output signals from the range detection means to the output register.

27. The apparatus of claim 19 wherein the programmable storage means comprises:

selectable storage means for storing a plurality of sets of timing parameters and output parameters, the plurality of sets of parameters being selectable.

28. The apparatus of claim 27 wherein the selectable storage means comprises:

a storage device for storing the plurality of sets of parameters; and multiplexing means, coupled to the storage device, for multiplexing between the plurality of sets of parameters.

* * * * *

UNITED STATES PATENT AND TRADEMARK OFFICE
CERTIFICATE OF CORRECTION

PATENT NO. : 5,455,930
DATED : October 3, 1995
INVENTOR(S) : Larson

It is certified that error appears in the above-indentified patent and that said Letters Patent is hereby corrected as shown below:

Column 20, line 54, please delete "lead" and insert --load--.

Signed and Sealed this

Second Day of January, 1996

BRUCE LEHMAN

*Attest:*

*Attesting Officer*  *Commissioner of Patents and Trademarks*